US012558730B2

(12) United States Patent
Imayoshi et al.

(10) Patent No.: US 12,558,730 B2
(45) Date of Patent: Feb. 24, 2026

(54) WORK MACHINE

(71) Applicant: KOKI HOLDINGS CO., LTD., Tokyo (JP)

(72) Inventors: Masahide Imayoshi, Ibaraki (JP); Kenichi Matsunaga, Ibaraki (JP); Keisuke Maeda, Ibaraki (JP); Naoto Ise, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 275 days.

(21) Appl. No.: 18/566,541

(22) PCT Filed: Mar. 25, 2022

(86) PCT No.: PCT/JP2022/014473
§ 371 (c)(1),
(2) Date: Dec. 1, 2023

(87) PCT Pub. No.: WO2022/254907
PCT Pub. Date: Dec. 8, 2022

(65) Prior Publication Data
US 2024/0359244 A1      Oct. 31, 2024

(30) Foreign Application Priority Data

Jun. 4, 2021     (JP) ................................. 2021-094263

(51) Int. Cl.
*B23D 45/16*          (2006.01)
*B23D 47/02*          (2006.01)
*B23D 59/00*          (2006.01)
(52) U.S. Cl.
CPC ............. *B23D 45/16* (2013.01); *B23D 47/02* (2013.01); *B23D 59/006* (2013.01)
(58) Field of Classification Search
CPC ....... B23D 45/16; B23D 59/006; B23D 47/02
See application file for complete search history.

(56) References Cited

U.S. PATENT DOCUMENTS 7,578,063 B2 *   8/2009   Martin ...................... B27B 9/02
                                                              30/390
8,967,922 B2 *   3/2015   Yoshikane ......... B23Q 11/0046
                                                              408/67

(Continued)

FOREIGN PATENT DOCUMENTS

JP          60-123203  U1    8/1985
JP          7-31305  U1      6/1995

(Continued)

*Primary Examiner* — Sean M Michalski

(74) *Attorney, Agent, or Firm* — NovoTechIP International PLLC

(57)          ABSTRACT

The present invention improves workability. A cutting work machine has a discharge channel, concave with a discharge opening open to the left, disposed at an outer peripheral portion of a saw cover. A discharge inlet portion that connects the saw cover and the discharge channel are formed at a front end of the discharge channel. Viewed from above, a side guide surface constituting the right-side surface of the discharge channel inclines to the left toward the rear. The rear surface of the discharge channel consists of a rear guide surface inclined to the rear toward the left side. Thus, cutting chips flowing towards the rear-end side of the discharge channel along the side guide surface hit the rear guide surface and changes the chip outflow direction to the left side (discharge opening side). With cutting chips being discharged substantially leftward from the discharge opening, the workability of the cutting work machine improves.

15 Claims, 15 Drawing Sheets

(56)                References Cited

U.S. PATENT DOCUMENTS

| | | | | |
|---|---|---|---|---|
| 10,800,003 | B2 * | 10/2020 | Moller | B24B 55/052 |
| 11,077,507 | B1 * | 8/2021 | Matson | B27G 19/04 |
| 11,273,505 | B2 * | 3/2022 | Hansen | B23D 59/006 |
| 12,318,853 | B2 * | 6/2025 | Yu | B27B 5/207 |
| 2007/0155296 | A1 * | 7/2007 | Hofmann | B24B 55/052 |
| | | | | 451/451 |
| 2010/0269353 | A1 * | 10/2010 | Martin | B27B 9/02 |
| | | | | 30/390 |
| 2010/0313867 | A1 * | 12/2010 | Loveless | B23D 59/006 |
| | | | | 125/13.01 |
| 2011/0021121 | A1 * | 1/2011 | Loveless | B24B 23/028 |
| | | | | 451/456 |
| 2011/0185581 | A1 * | 8/2011 | Xing | B25F 5/02 |
| | | | | 30/390 |
| 2012/0121354 | A1 * | 5/2012 | Dickey | B23B 31/20125 |
| | | | | 279/142 |
| 2014/0260848 | A1 * | 9/2014 | Gantke | B23D 45/048 |
| | | | | 83/100 |
| 2015/0266201 | A1 | 9/2015 | Nakashima | |
| 2017/0225358 | A1 * | 8/2017 | Carlsson | B26D 7/1863 |
| 2018/0161891 | A1 | 6/2018 | Nishikawa | |
| 2018/0169885 | A1 * | 6/2018 | Okouchi | B26D 1/14 |
| 2020/0306849 | A1 * | 10/2020 | Hansen | B23D 45/16 |
| 2022/0314348 | A1 * | 10/2022 | Yu | B27G 19/02 |
| 2023/0278119 | A1 * | 9/2023 | Tagami | B25F 5/02 |
| | | | | 173/71 |
| 2024/0359244 | A1 * | 10/2024 | Imayoshi | B23D 45/16 |

FOREIGN PATENT DOCUMENTS

| | | |
|---|---|---|
| JP | 2010069588 A | 4/2010 |
| JP | 2012-152897 A | 8/2012 |
| JP | 2015178154 A | 10/2015 |
| JP | 2020163780 A | 10/2020 |
| WO | 2016194536 A1 | 12/2016 |

* cited by examiner

1

WORK MACHINE

BACKGROUND OF THE INVENTION

1. Field of the Invention

The present invention relates to a work machine.

2. Description of the Related Art

A portable cutting machine (work machine) described in Patent Literature 1 below has a saw blade and a saw cover covering an upper portion of the saw blade. A link cover having a chip discharge opening is attached to the saw cover. As a result, cutting chips flowing backward in the saw cover are discharged from the chip discharge opening during a cutting process by the portable cutting machine.

RELATED ART LITERATURE

Patent Literature

Patent Literature 1

Japanese Unexamined Patent Application Publication (JP-A) No. 2010-069588 A.

SUMMARY OF THE INVENTION

Disclosure of the Invention

Problem to be Solved by the Invention

During the cutting process with the portable cutting machine, cutting chips flowing backward in the saw cover are discharged from the chip discharge opening, as described above. Therefore, the cutting chips discharged from the chip discharge opening may be blown out to an operator positioned at the rear side of the portable cutting machine. In this case, a workability may be reduced by the cutting chips discharged from the chip discharge opening. In another case, by configuring the work machine to be able to be suspended from a vertical member such as wood, the work machine can be temporarily stored in a suspension state when the work machine is not in use, for example, when processing work is temporarily suspended. However, if the suspension state is unstable, a posture of the work machine may change due to vibration or wind, and the work machine may be suspended in a position or state that the operator does not intend. In this case, the posture may need to be corrected which may reduce workability. In recent years, brushless motors are increasingly being used in work machine. In this case, a control circuit to control the brushless motor is required, and a space to house the control circuit is also needed, which may increase the size of the work machine and reduce workability.

Considering the above facts, the present invention aims to provide a work machine that can improve workability.

Means to Solve the Problem

At least one embodiment of the present invention is a work machine comprising: an output shaft driven by a power of a prime mover; a disk-shaped circular saw blade held at an end in one side in an axial direction of the output shaft; a saw cover that covers the circular saw blade from at least one side in the axial direction and from radially outside of the circular saw blade; and a discharge channel provided at the saw cover, disposed radially outside of the circular saw blade, formed in a concave shape with a discharge opening opened to one side in the axial direction, and discharges the chips that flow backward inside the saw cover during processing through the discharge opening. The discharge channel includes: an inlet portion formed at a front end of the discharge channel and opened to a front side to communicate an inside of the saw cover with an inside of the discharge channel; a side guide surface that constitutes a side surface on the other side in the axial direction in the discharge channel and inclines toward one side in the axial direction toward a rear side when viewed from above; and a rear guide surface that constitutes a rear surface of the discharge channel, is connected to a rear end of the side guide surface, and changes the direction of the chips flowing backward along the side guide surface to one side in the axial direction.

At least one embodiment of the present invention is the work machine, wherein the rear guide surface is inclined rearwardly toward one side in the axial direction, when viewed from above.

At least one embodiment of the present invention is the work machine, wherein an inclination angle of the rear guide surface with respect to the front-back direction is set greater than the inclination angle of the side guide surface with respect to the front-back direction when viewed from above.

At least one embodiment of the present invention is the work machine, wherein the discharge channel has a lower-guide surface, and the lower-guide surface is disposed below the rear end of the side guide surface and adjacent to the front side of the rear guide surface, and is inclined toward the bottom to one side in the axial direction, when viewed from the front-back direction.

At least one embodiment of the present invention is the work machine, wherein the lower-guide surface comprises an upper lower-guide surface that constitutes the upper portion of the lower-guide surface, and a lower lower-guide surface that constitutes the lower portion of the lower-guide surface, wherein an inclination angle of the upper lower-guide surface with respect to the up-down direction is set smaller than the inclination angle of the lower lower-guide surface with respect to the up-down direction.

At least one embodiment of the present invention is the work machine, wherein the up-down direction width of the upper lower-guide surface is set to increase toward the rear side when viewed from one side in the axial direction.

At least one embodiment of the present invention is the work machine, wherein the discharge opening is inclined downward toward the rear side, when viewed from the axial direction.

At least one embodiment of the present invention is the work machine, wherein the rear edge of the discharge opening is extended along the up-down direction, when viewed from the axial direction, and the rear guide surface is connected to the rear edge.

At least one embodiment of the present invention is a work machine comprising: an output shaft driven by a power of a prime mover; a disk-shaped circular saw blade held at an end in one side in an axial direction of the output shaft; a saw cover that covers the circular saw blade from at least one side in the axial direction and from radially outside of the circular saw blade; and a discharge channel provided at the saw cover, disposed radially outside of the circular saw blade, formed in a concave shape with a discharge opening opened to one side in the axial direction, and discharges the chips that flow backward inside the saw cover during processing through the discharge opening. The discharge channel includes: an inlet portion formed at a front end of the discharge channel and opened to a front side to communicate an inside of the saw cover with an inside of the discharge channel; a side guide surface that constitutes a side surface on the other side in the axial direction in the discharge channel and inclines toward one side in the axial direction toward a rear side when viewed from above; and a rear guide surface that constitutes a rear surface of the discharge channel, is connected to a rear end of the side guide surface, and inclines rearward toward one side in the axial direction when viewed from above. An inclination angle of the rear guide surface with respect to the front-back direction when viewed from above is set to be 60 degrees or more and greater than the inclination angle of the side guide surface with respect to the front-back direction.

At least one embodiment of the present invention is the work machine, wherein the inclination angle of the side guide surface with respect to the front-back direction is 10 degrees or more and 50 degrees or less. At least one embodiment of the present invention is the work machine, wherein the difference in inclination angle between the side guide surface and the rear guide surface is less than 60 degrees.

At least one embodiment of the present invention is a work machine, comprising: an output shaft driven by a power of a prime mover; a disk-shaped circular saw blade held at an end in one side in an axial direction of the output shaft; a saw cover that covers the circular saw blade from at least one side in the axial direction and from radially outside of the circular saw blade; and a discharge channel provided at the saw cover, disposed radially outside of the circular saw blade, formed in a concave shape with a discharge opening opened to one side in the axial direction, and discharges the chips that flow backward inside the saw cover during processing through the discharge opening. The discharge channel has a first guide surface that extends in a direction that intersects a direction of movement of the chips that flows into the discharge channel and guides the chips to the discharge opening, and a second guide surface that is connected between the first guide surface and the discharge opening. The second guide surface has a greater inclination angle with respect to the direction of movement than the first guide surface.

At least one embodiment of the present invention is the work machine, wherein the direction of movement is backward or downward. At least one embodiment of the present invention is the work machine, wherein the first guide surface and the second guide surface are each configured as a substantially plane.

At least one embodiment of the present invention is a work machine, comprising: a brushless motor with a drive shaft; a controller comprising an inverter circuit that controls the brushless motor; and a housing having a main housing that houses the controller, and a motor housing that houses the brushless motor. The motor housing supports a power supply that is connected to a power source outside the housing to supply power to the brushless motor and the controller, and is connected to the main housing.

At least one embodiment of the present invention is a work machine with an output portion driven by a prime mover comprising: a housing with a handle; a suspension arm with one end connected to the housing and having a hook at the other end; and a sub-handle provided on the housing and protruding from the housing. The sub-handle contacts a suspension support member when the work machine is suspended by the hook on the vertically extending suspension support member.

Advantage of the Present Invention

According to one or more embodiments of the present invention, workability can be improved.

DETAILED DESCRIPTION OF THE INVENTION

Figure 1:
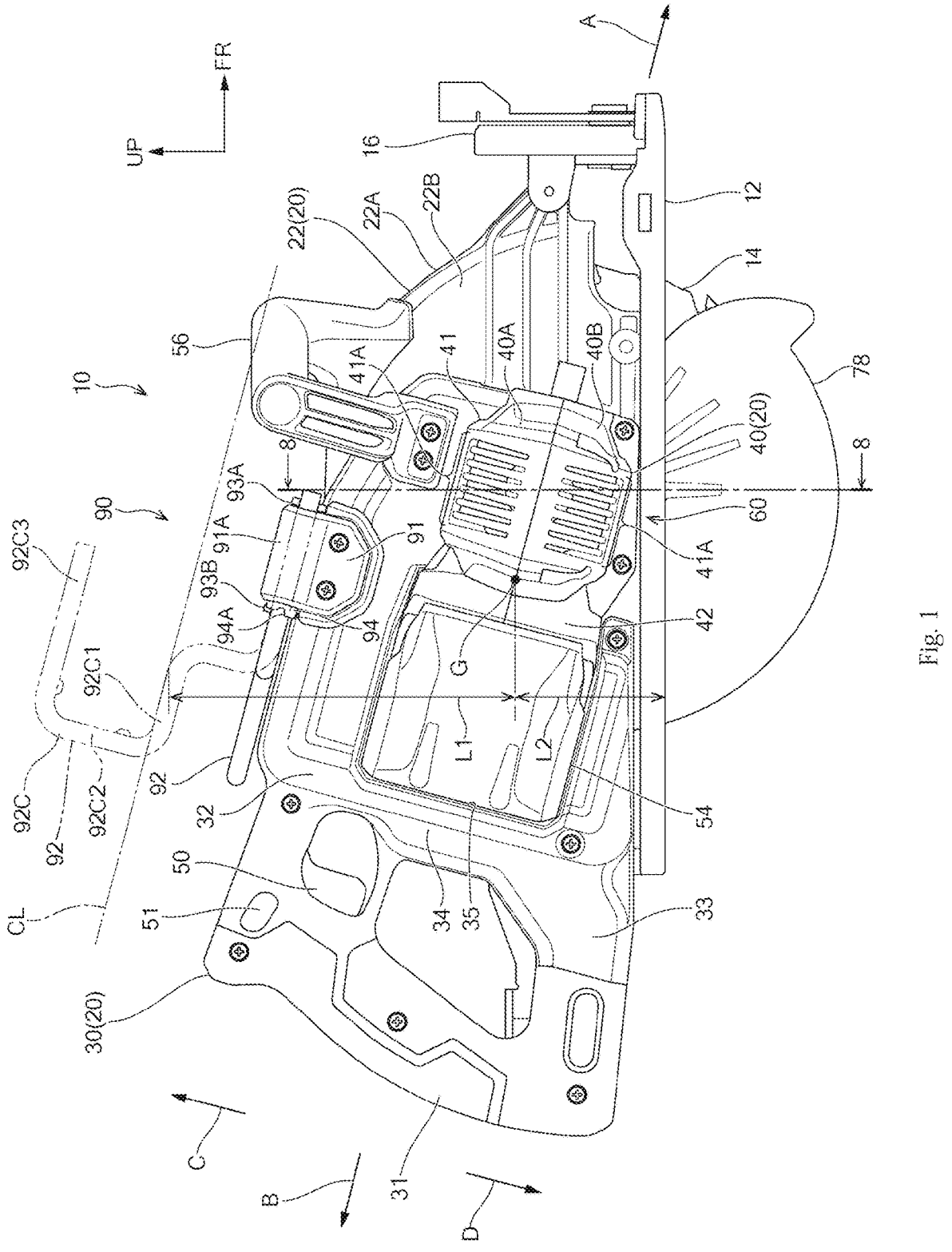
FIG. 1 is a side view viewed from the right side showing a cutting work machine according to the present embodiment.

A cutting work machine 10 as a work machine according to the present embodiment will be described below with reference to the drawings. The arrows UP, FR, and RH, indicated as appropriate in the drawings, respectively indicate the upper, front, and right sides of the cutting work machine 10. In the following description, when the directions of up-down, front-back, and left-right are used, they shall indicate the up and down, front and back, and left and right directions of the cutting work machine 10, unless otherwise noted.

Figure 2:
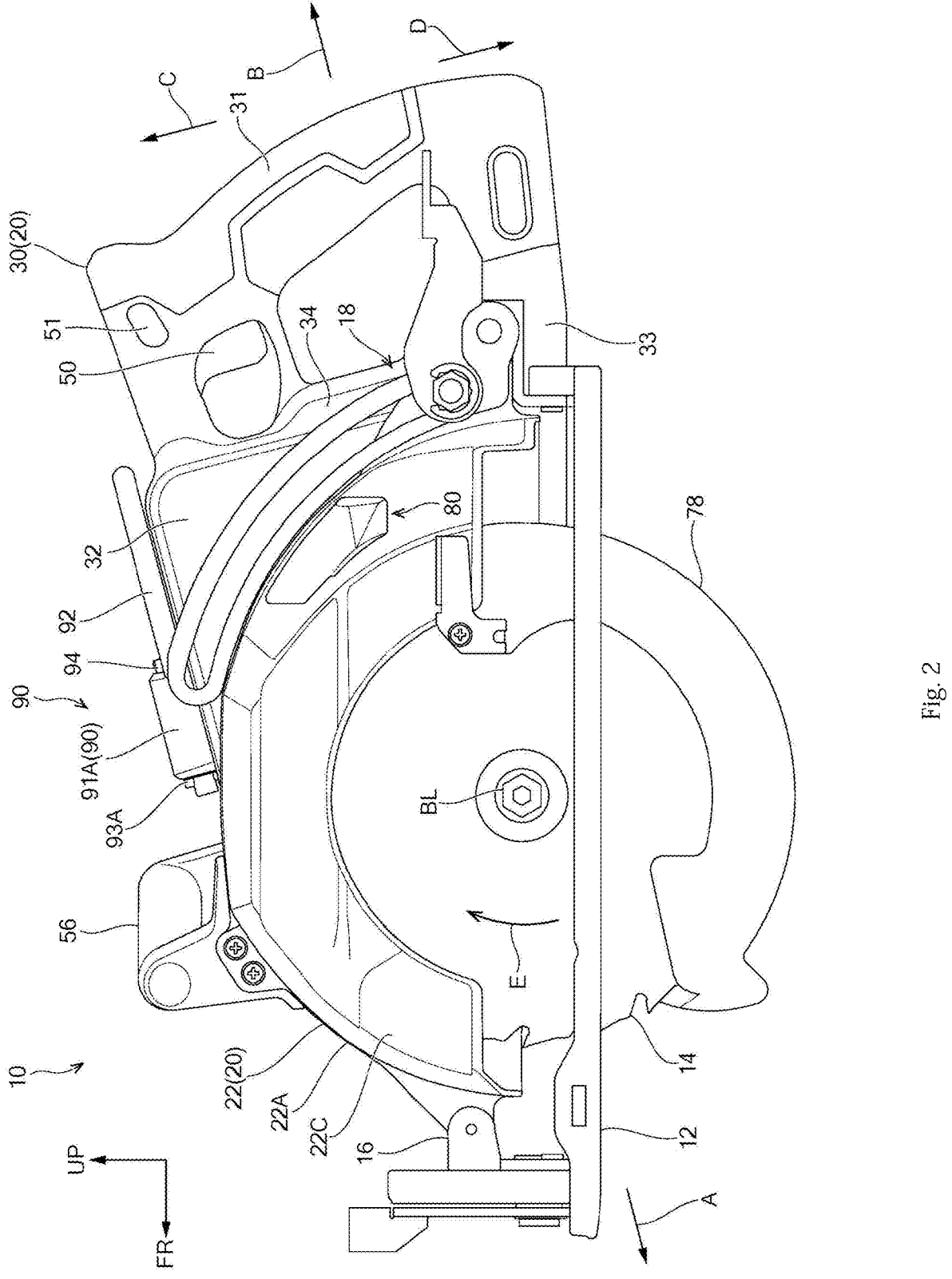
FIG. 2 is a side view of the cutting work machine shown in FIG. 1 viewed from the left side.

The direction that inclines downward toward the front side viewed from the left-right direction is a first direction (arrow A and arrow B directions in FIG. 1 and FIG. 2). The direction orthogonal to the first direction is a second direction (arrow C and arrow D directions in FIG. 1 and FIG. 2). Furthermore, the side in the direction of arrow A in FIG. 1 and FIG. 2 is a one side in the first direction, the side in the direction of arrow B in FIG. 1 and FIG. 2 is an other side in the first direction, the side in the direction of arrow C in FIG. 1 and FIG. 2 is a one side in the second direction, and the side in the direction of arrow D in FIG. 1 and FIG. 2 is an other side in the second direction.

The cutting work machine 10 is configured as the work machine for cutting wood and other materials to be processed. As shown in FIG. 1 through FIG. 4, the cutting work machine 10 comprises a base 12, a housing 20, a motor unit 60, a controller 70 and a transmission mechanism 72 (cf. FIG. 8) housed in the housing 20, and a sub-handle 56 provided on the housing 20. The cutting work machine 10 also has a battery pack 54 as a battery to supply power to a brushless motor 61 of the motor unit 60 and the controller 70. Furthermore, the cutting work machine 10 has a suspension mechanism 90, and when the cutting work machine 10 is not in use, the suspension mechanism 90 is used to suspend the cutting work machine 10 from a suspension support member 100, such as vertically extending wood. Each configuration of the cutting work machine 10 will be described below.

Base 12

As shown in FIG. 1 through FIG. 3 and FIG. 8, the base 12 is formed in the shape of a substantially rectangular plate with the up-down direction as a thickness direction and the front-back direction as a longitudinal direction. During the cutting process with the cutting work machine 10, the base 12 is placed on the material to be processed, and the lower surface of the base 12 is slid forward along the upper surface of the material to be processed. In the left portion of the base 12, a tool insertion portion 12A is formed through the base 12 for disposing a circular saw blade 14 as a tool. The tool insertion portion 12A is formed in a substantially rectangular hole shape with the front-back direction as the longitudinal direction in planar view. The circular saw blade 14 is formed in a substantially disc shape with the left-right direction as the thickness direction. A central portion of the circular saw blade 14 is fixed to an output shaft 73 of the transmission mechanism 72, which will be described further below, so as to be integrally rotatable therewith (cf. FIG. 8). The circular saw blade 14 is disposed within the tool insertion portion 12A, with the upper portion of the circular saw blade 14 protruding upwardly from the base 12 and the lower end portion of the circular saw blade 14 protruding downwardly from the base 12.

Housing 20

As shown in FIG. 1 to FIG. 8, the housing 20 comprises a saw cover 22 covering the circular saw blade 14, a handle housing 30 and a motor housing 40 as the main housing attached to the saw cover 22. The motor housing 40 constitutes a part of the motor unit 60, which is described further below.

Saw Over 22

The saw cover 22 is configured as a member covering the upper portion of the circular saw blade 14. The saw cover 22 is formed in a substantially semicircular shape that is convex to the upper side and concave open to the lower side when viewed from the right side. Specifically, the saw cover 22 comprises an outer circumferential wall 22A extending in the radially outside of the circular saw blade 14 in the substantially circumferential direction of the circular saw blade 14, a right wall 22B extending from a right end of the outer circumferential wall 22A to the radially inside of the outer circumferential wall 22A, and a left wall 22C as a "side wall" extending from a left end of the outer circumferential wall 22A to the radially inside of the outer circumferential wall 22A. The right wall 22B is formed as a substantially semi-circular plate convex to the upper side in a side view, and the left wall 22C is formed as a substantially semi-circular arcuate plate convex to the upper side in a side view. A transmission mechanism housing 22D is formed in the middle portion of the lower end of the right wall 22B in the front-back direction to house the transmission mechanism 72 described further below (cf. FIG. 4). The transmission mechanism housing 22D is formed in a substantially rectangular cylindrical shape and protrudes to the right side from the right wall 22B.

The front end of the saw cover 22 is connected to the front end of the base 12 via a front connecting mechanism 16. The rear end of the saw cover 22 is connected to the rear end of the base 12 via a rear connecting mechanism 18. During the cutting process of the material to be processed, the circular saw blade 14 rotates to one side in the direction of rotation (arrow E direction in FIG. 2), and cutting chips as chips are rolled up at the front end of the circular saw blade 14 and flow rearward in the radially outside the circular saw blade 14 in the saw cover 22. Furthermore, the saw cover 22 is provided with a discharge channel 80 (cf. FIG. 2), through which the cutting chips are discharged to the outside of the saw cover 22. The discharge channel 80 is described further below.

Handle Housing 30

As shown in FIG. 1 through FIG. 5, the handle housing 30 is disposed on the right side of the saw cover 22. The handle housing 30 is configured by the handle housing members divided into two parts in the left-right direction. The divided handle housing members are attached to each other to form the handle housing 30. Specifically, after the handle housing member on the left side is assembled to the saw cover 22, the handle housing member on the right side is attached to the handle housing member on the left side.

The handle housing 30 is formed in a substantially U-shape open to the front side, when viewed from the right side. Specifically, the handle housing 30 comprises a handle 31 composing the rear end of the handle housing 30, an upper housing portion 32 extending forward from the handle 31 and composing the upper end of the handle housing 30, and a lower housing portion 33 extending forward from the handle 31 and composing the lower end of the handle housing 30.

The handle 31 is configured as a gripping portion to be grasped by the user. The handle 31 is disposed rearward than the saw cover 22 and extends in a direction that inclines forward toward the upper side in the side view. Specifically, in side view, the handle 31 is slightly tilted forward with respect to the second direction. A trigger 50 is provided at the upper end portion of the handle 31. The trigger 50 protrudes forward from the handle 31 and is configured to be able to be pulled to the rear side. The handle 31 is also provided with a lock button 51 for locking the pulling operation of the trigger 50 on upper diagonal rear of the trigger 50. Thus, the trigger 50 cannot be pulled unless the lock button 51 is operated. In addition, a switch mechanism 52 is provided inside the handle 31, at the rear side of the trigger 50 (cf. FIG. 4 and FIG. 5). Said switch mechanism 52 has a switch, not shown, which is operated by the trigger 50. The switch is electrically connected to the controller 70, which is described further below, and outputs an output signal to the controller 70 depending on the operating state of the trigger 50.

The upper housing portion 32 extends from the upper end of the handle 31 to one side in the first direction. The front end of the upper housing portion 32 is disposed on the right side of the saw cover 22 and upper side of the transmission mechanism housing 22D, and is fixed to the saw cover 22. The lower housing portion 33 extends forward from the lower end of the handle 31. The front end of the lower housing portion 33 is disposed on the right side of the saw cover 22 and rearward than the front end of the upper housing portion 32, and is fixed to the saw cover 22.

The handle housing 30 has a handle middle portion 34, which connects the longitudinal middle portion of the upper housing portion 32 and the front end and longitudinal middle portion of the lower housing portion 33. The handle middle portion 34 is disposed adjacent to the other side in the first direction of the transmission mechanism housing 22D of the saw cover 22.

A battery housing 35 is formed at the front portion of the handle middle portion 34 to house the battery pack 54 described further below. The battery housing 35 is formed in a concave shape open to the right side and is disposed adjacent on the other side in the first direction of the transmission mechanism housing 22D. The battery housing 35 is formed in a substantially rectangular shape and is inclined along the first direction with respect to the front-back direction when viewed from the right side. The outer wall of the battery housing 35 is configured as a compartment wall 35A. A front wall is not formed at the compartment wall 35A and the battery housing 35 is open to one side in the first direction. Furthermore, a wiring insertion portion 35B is formed at the front end of the upper wall of the compartment wall 35A (cf. FIG. 4 and FIG. 5). The wiring insertion portion 35B is formed in the compartment wall 35A in the handle housing member on the left side, and is concave and open to the right side. As a result, the wiring insertion portion 35B communicates the inside of the battery housing 35 with the inside of the upper housing portion 32.

Figure 4:
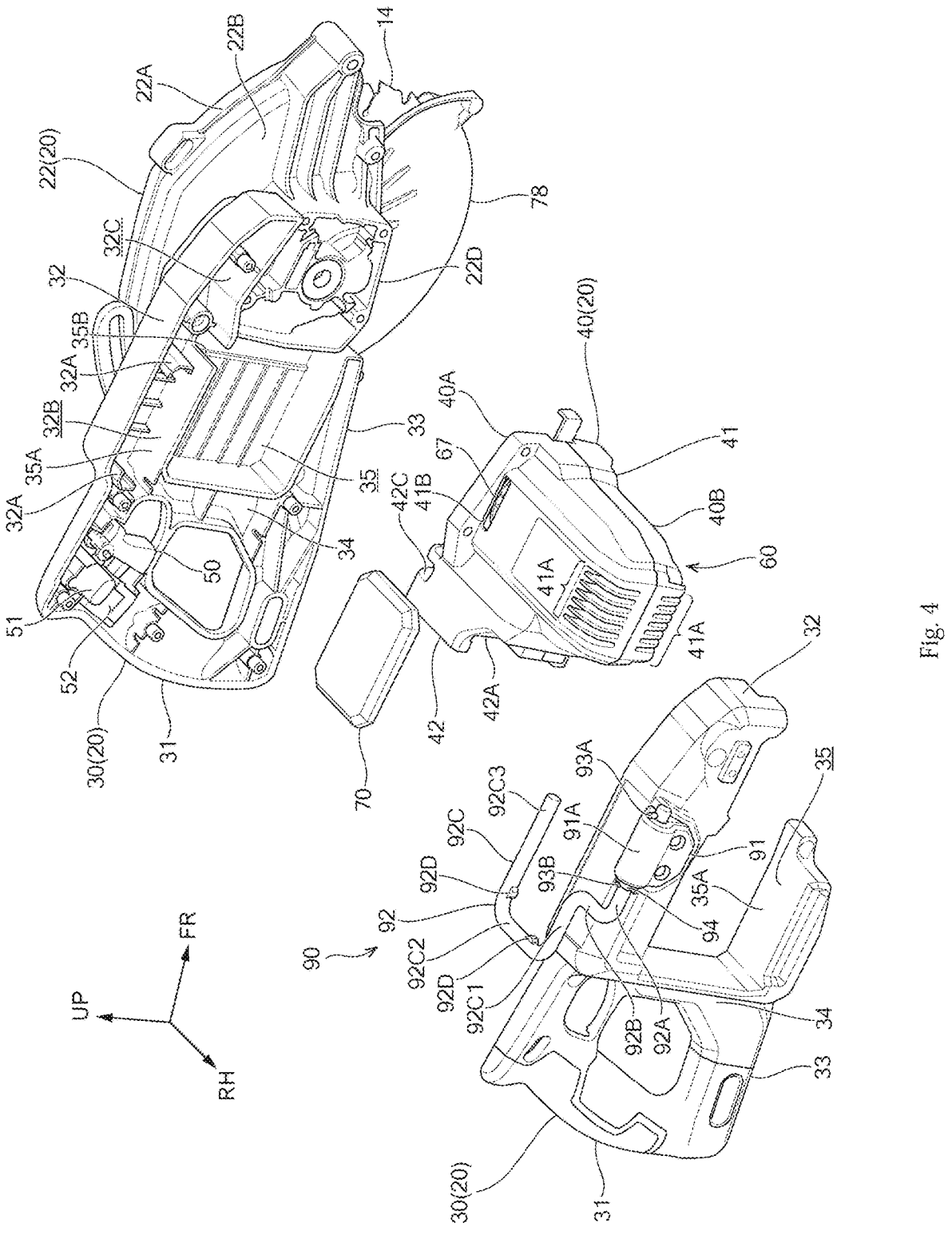
FIG. 4 is an exploded perspective view in which a housing shown in FIG. 1 is partially exploded.
Figure 5:
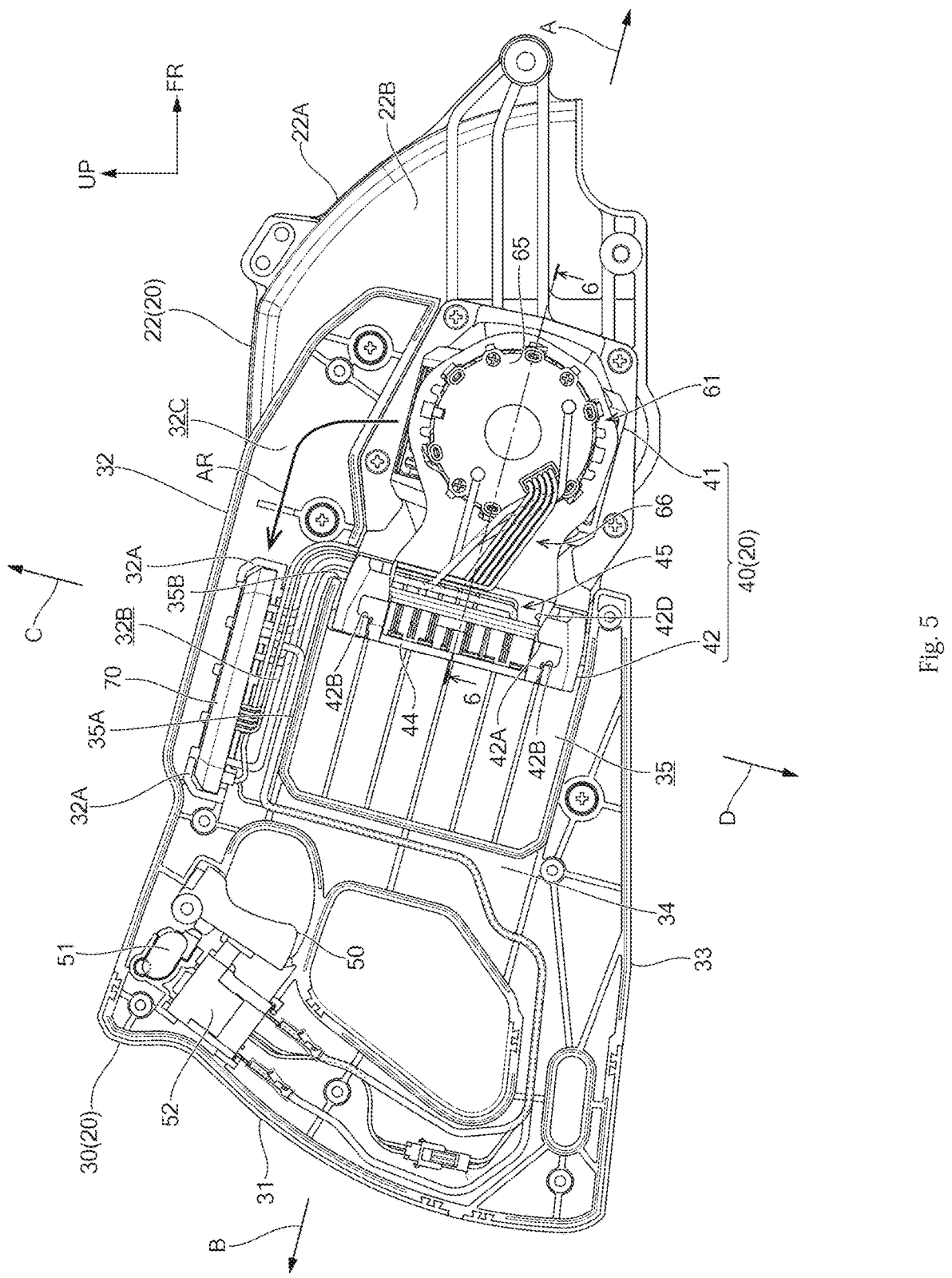
FIG. 5 is side view showing an inside of a handle housing shown in FIG. 1 with a battery pack removed and a motor housing partially cut away.

As shown in FIG. 4 and FIG. 5, at the upper housing portion 32, a front-back pair of controllers holding portions 32A, which hold the controller 70 to be described further below, is formed on one side in the second direction with respect to the battery housing 35. Furthermore, a space on the other side in the second direction to the controller holding portion 32A in the upper housing portion 32 is configured as a wiring housing 32B for housing a wiring 45 and a wiring 66 described further below. The wiring housing 32B and the battery housing 35 are separated by the compartment wall 35A of the battery housing 35 and are communicated by the wiring insertion portion 35B.

Figure 8:
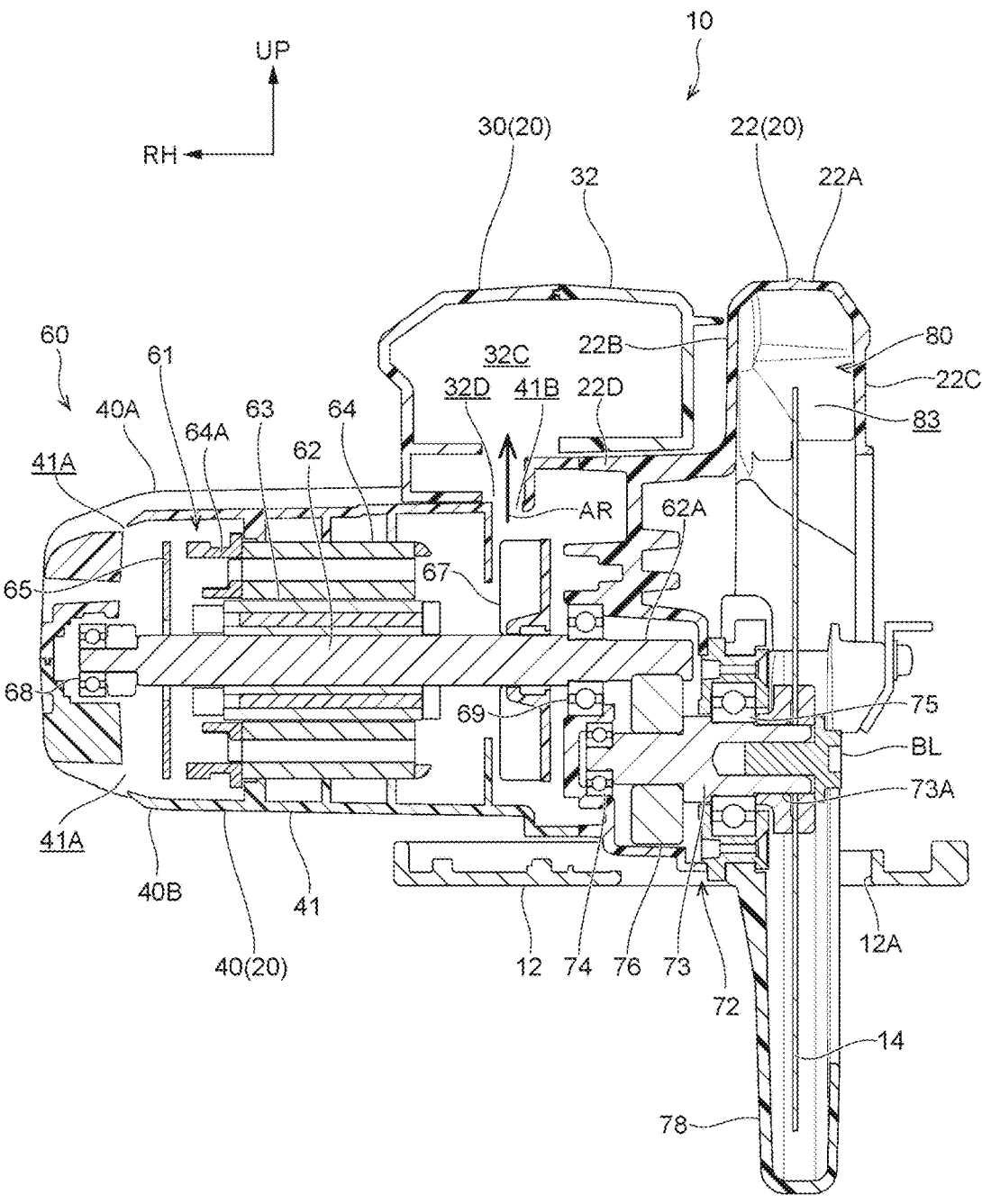
FIG. 8 is a cross-sectional view showing the inside of a motor unit shown in FIG. 1 (cross-sectional view taken along a line 8-8 in FIG. 1).

An internal space at the front end of the upper housing portion 32 is configured as an airflow path 32C for flowing a cooling air AR generated by a fan 67 described further below to the controller 70 side. As shown in FIG. 8, a blowing is 32D is formed through the lower wall at the front end of the upper housing portion 32, and the airflow path

32C is communicated with the outside of the upper housing portion 32 by the blowing hole 32D.

Motor Housing 40

As shown in FIG. 1 and FIG. 3 to FIG. 8, the motor housing 40 is configured as a part of the motor unit 60, described further below, and as a member that houses the brushless motor 61 of the motor unit 60. In addition, a battery pack 54 described further below is removably mounted in the motor housing 40, and the motor housing 40 is also configured as a member that supports the mounted battery pack 54. Furthermore, the motor housing 40 is configured by the motor housing members 40A and 40B, which are divided into two parts in the second direction. The motor housing 40 is formed by attaching the motor housing members 40A and 40B together.

The motor housing 40 has a motor cover 41, which is formed as a substantially bottomed cylinder open to the left side. The motor cover 41 is disposed on the right side of the transmission mechanism housing 22D of the saw cover 22. The left end of the motor cover 41 is fastened to the side wall of the transmission mechanism housing 22D. As a result, the motor housing 40 is disposed adjacent to the other side in the second direction of the front end of the upper housing portion 32.

A plurality of air intake holes 41A are formed at the right end of the motor cover 41 at the corners on both sides in the second direction, respectively. The plurality of air intake holes 41A extend from the bottom wall to the side walls of the motor cover 41 in the left-right direction and are arranged side by side in the first direction. At the left end of the motor cover 41, an exhaust hole 41B is formed on one side in the second direction (cf. FIG. 4, FIG. 7, and FIG. 8). The exhaust hole 41B is disposed below the blowing hole 32D of the upper housing portion 32. As a result, the inside of the motor cover 41 and the airflow path 32C are communicated by the exhaust hole 41B and the blowing hole 32D.

As shown in FIG. 4 through FIG. 7, the motor housing 40 has a battery mounting portion 42 (which is an element broadly understood as a power supply support). The battery mounting portion 42 protrudes from the left side portion (opening side portion) of the motor cover 41 to the other side in the first direction and is disposed within the end portion in the one side in the first direction of the battery housing 35 in the handle housing 30. The left end of the battery mounting portion 42 protrudes leftward than the motor cover 41.

The battery mounting portion 42 has a battery insertion portion 42A open to the other side in the first direction and to the right side. The battery mounting portion 42 also has a pair of housing-side rail 42B formed on both side walls in the second direction with respect to the battery insertion portion 42A. The housing-side rail 42B are formed in the form of grooves open inwardly in the second direction and extend in the left-right direction. The battery mounting portion 42 is provided with a battery terminal 44 as a power supply (cf. FIG. 5 and FIG. 6), and the battery terminal 44 is sandwiched from both sides in the second direction by the motor housing members 40A and 40B. The battery terminal 44 is exposed from the battery insertion portion 42A to one side in the first direction and is electrically connected to the controller 70 described further below by means of wiring 45 (cf. FIG. 5 and FIG. 6).

At the left end of the battery mounting portion 42, a wiring hole 42C as a wiring arrangement portion is formed on one side in the first direction than the battery terminal 44. The wiring hole 42C is a hole open to the left side and penetrates in the second direction. The wiring hole 42C penetrates in the second direction and communicates the motor housing 40 with the outside. The wiring hole 42C is disposed on the other side in the second direction with respect to the wiring insertion portion 35B of the handle housing 30. A portion of the battery terminal 44 is exposed in the wiring hole 42C, and wiring 45 extending from the battery terminal 44 is arranged in the wiring hole 42C, the wiring insertion portion 35B, and the wiring housing 32B and connected to the controller 70 described further below (cf. FIG. 5 and FIG. 6).

A wiring insertion hole 42D (cf. FIG. 6 and FIG. 7) is formed through the bottom wall of wiring hole 42C, and the wiring insertion hole 42D extends along the longitudinal direction of the wiring hole 42C. The wiring insertion hole 42D communicates the wiring hole 42C with the motor cover 41.

Battery Pack 54

Figure 3:
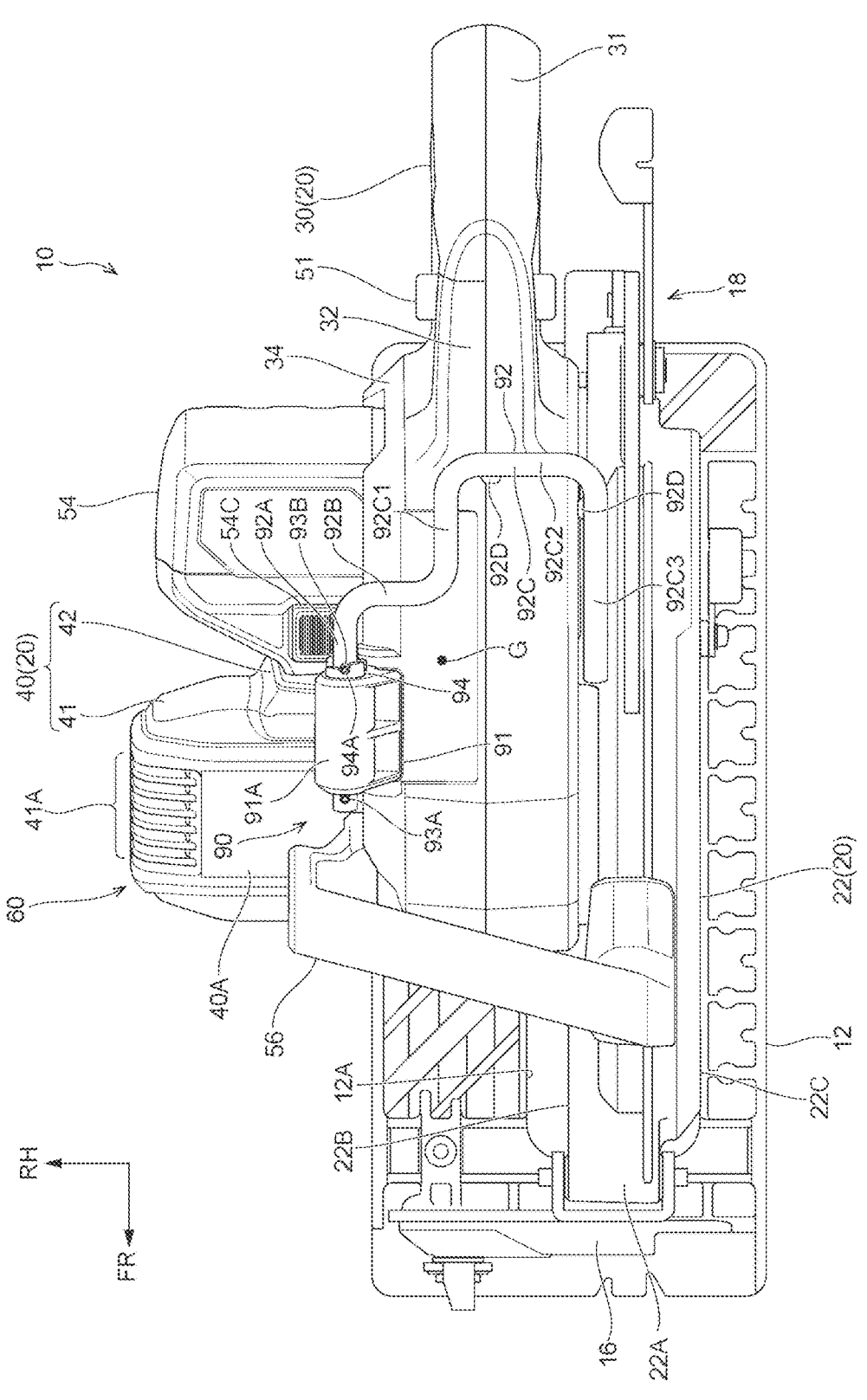
FIG. 3 is a plan view of the cutting work machine shown in FIG. 1 viewed from above.
Figure 9:
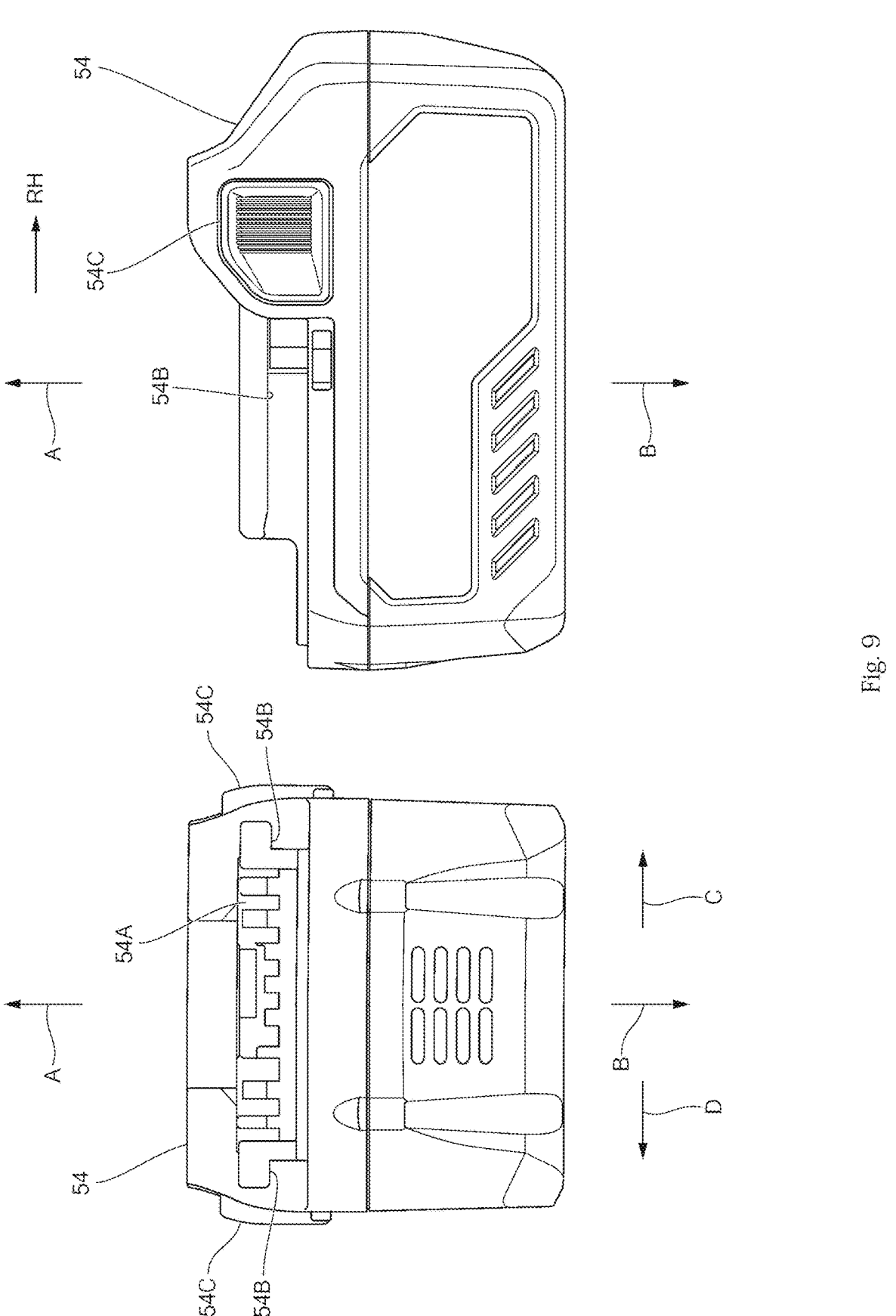
FIG. 9 is a two-sided view of the battery pack shown in FIG. 1 viewed from the left side and one side in the second direction.
Figure 10:
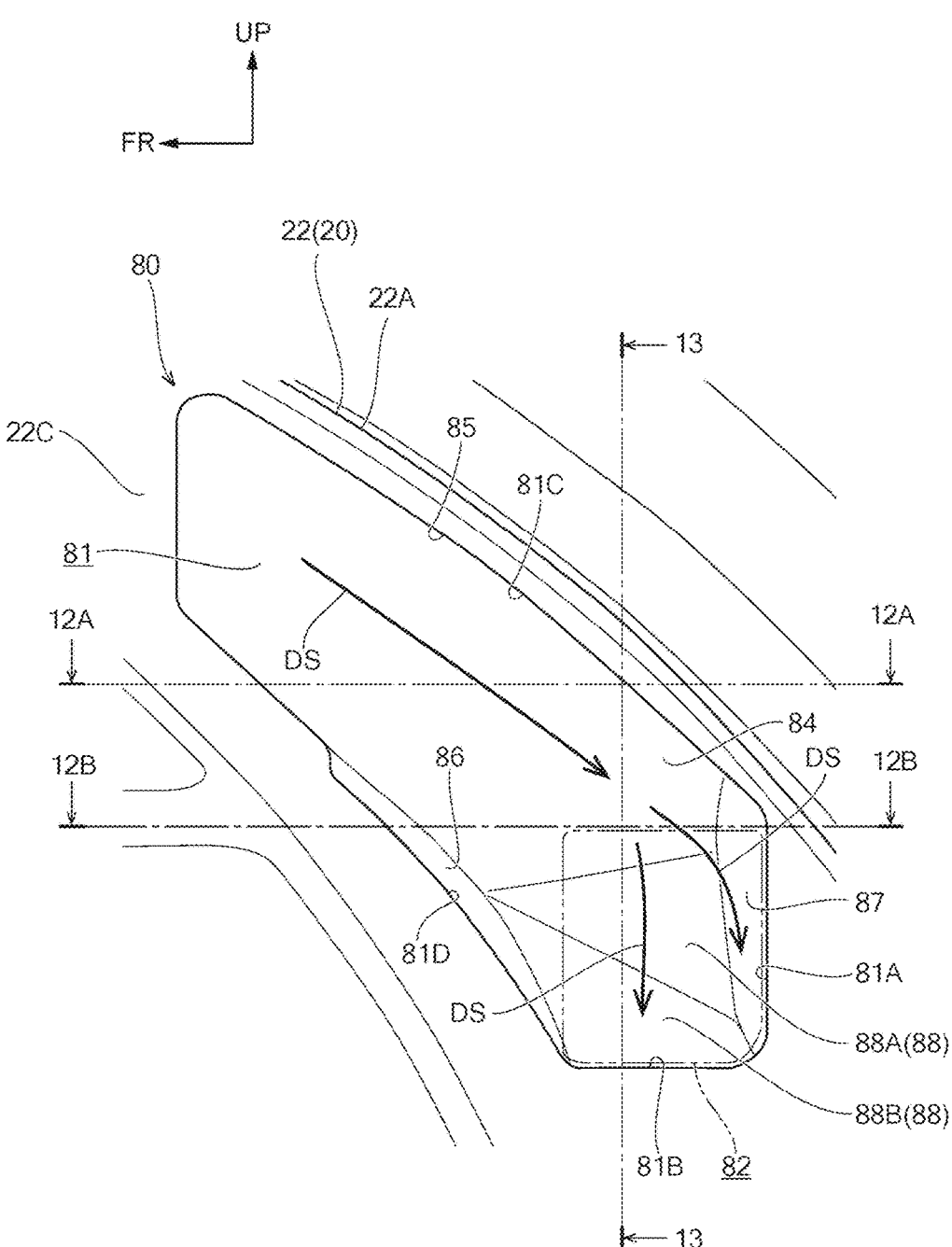
FIG. 10 is an enlarged side view showing a discharge channel shown in FIG. 2.

As shown in FIG. 1, FIG. 3, and FIG. 9, the battery pack 54 is formed in substantially rectangular shape. A connector 54A is provided at the upper portion of the battery pack 54. A battery-side rail 54B is formed at both ends in the width direction of the connector 54A. The battery-side rail 54B is formed in a substantially inverse L-shape when viewed from the front side of the battery pack 54, extends in the longitudinal direction of the battery pack 54, and is open to the front side.

The battery pack 54 is then housed from the right side in the battery housing 35 of the housing 20 and is mounted to the battery mounting portion 42 of the motor housing 40. Specifically, the housing-side rail 42B is slidably inserted in the battery-side rail 54B in the left-right direction, and the housing-side rail 42B and the battery-side rail 54B are engaged in the first direction. Furthermore, in a mounting state of the battery pack 54, the connector 54A is connected to the battery terminal 44 of the motor housing 40, and power is supplied from the battery pack 54 to the controller 70 described further below.

Locking members 54C are provided on each side of the battery pack 54. In the mounting state of the battery pack 54, the lock members 54C engage the motor housing 40 to keep the mounting state of the battery pack 54.

Furthermore, in the mounting state of the battery pack 54 to the battery mounting portion 42, the left end of the battery pack 54 is disposed on the left side than the fan 67, which is described further below, and the right end of the battery pack 54 is disposed on the left than the right end of the motor housing 40. In other words, the battery pack 54 is disposed so that it does not protrude to the right side than the motor housing 40. Furthermore, in this state, the lock members 54C are positioned to the right than the handle housing 30, and the lock members 54C are configured to be lock-unlock operable.

Sub-Handle 56

As shown in FIG. 1 through FIG. 3, the sub-handle 56 is extended in the left-right direction and is formed in a substantially U-shape, open to the lower side, when viewed from the rear side. The right end of the sub-handle 56 is fastened to the front end of the upper housing portion 32 in the handle housing 30. The left end of the sub-handle 56 is fastened to the upper end of the saw cover 22. The sub-handle 56 protrudes from the housing 20 to the upper side (specifically, to one side in the second direction). The left end of the sub-handle 56 is disposed forward than the right end of the sub-handle 56, and the sub-handle 56 is slightly inclined forward toward the left side when viewed from above.

Motor Unit 60

As shown in FIG. 4 through FIG. 6 and FIG. 8, the motor unit 60 comprises the aforementioned motor housing 40 and the brushless motor 61 as a prime mover.

Brushless Motor 61

The brushless motor 61 is housed in the motor cover 41 of the motor housing 40. The brushless motor 61 comprises a drive shaft 62, a rotor 63, and a stator 64.

The drive shaft 62 is disposed with the left-right direction as the axial direction. The right end of the drive shaft 62 (end in one side in the axial direction) is rotatably supported by a first motor bearing 68 fixed to the motor housing 40. The left portion of the drive shaft 62 is rotatably supported by a second motor bearing 69 fixed to the transmission mechanism housing 22D of the saw cover 22. The left end of the drive shaft 62 protrudes from the second motor bearing 69 to the left side, and a pinion gear 62A is formed on the left end of the drive shaft 62.

The rotor 63 is formed in a substantially cylindrical shape with the left-right direction as the axial direction, is disposed radially outside of the drive shaft 62, and is configured to rotate integrally with the drive shaft 62. The stator 64 is formed in a substantially cylindrical shape with the front-back direction as the axial direction, and is supported by the motor housing 40 in the radially outside of the rotor 63. The stator 64 has a stator holder 64A, and a stator coil is wound around the stator holder 64A. A motor substrate 65 is fixed to the right end of the stator holder 64A, and the stator coil is connected to the motor substrate 65.

Figure 6:
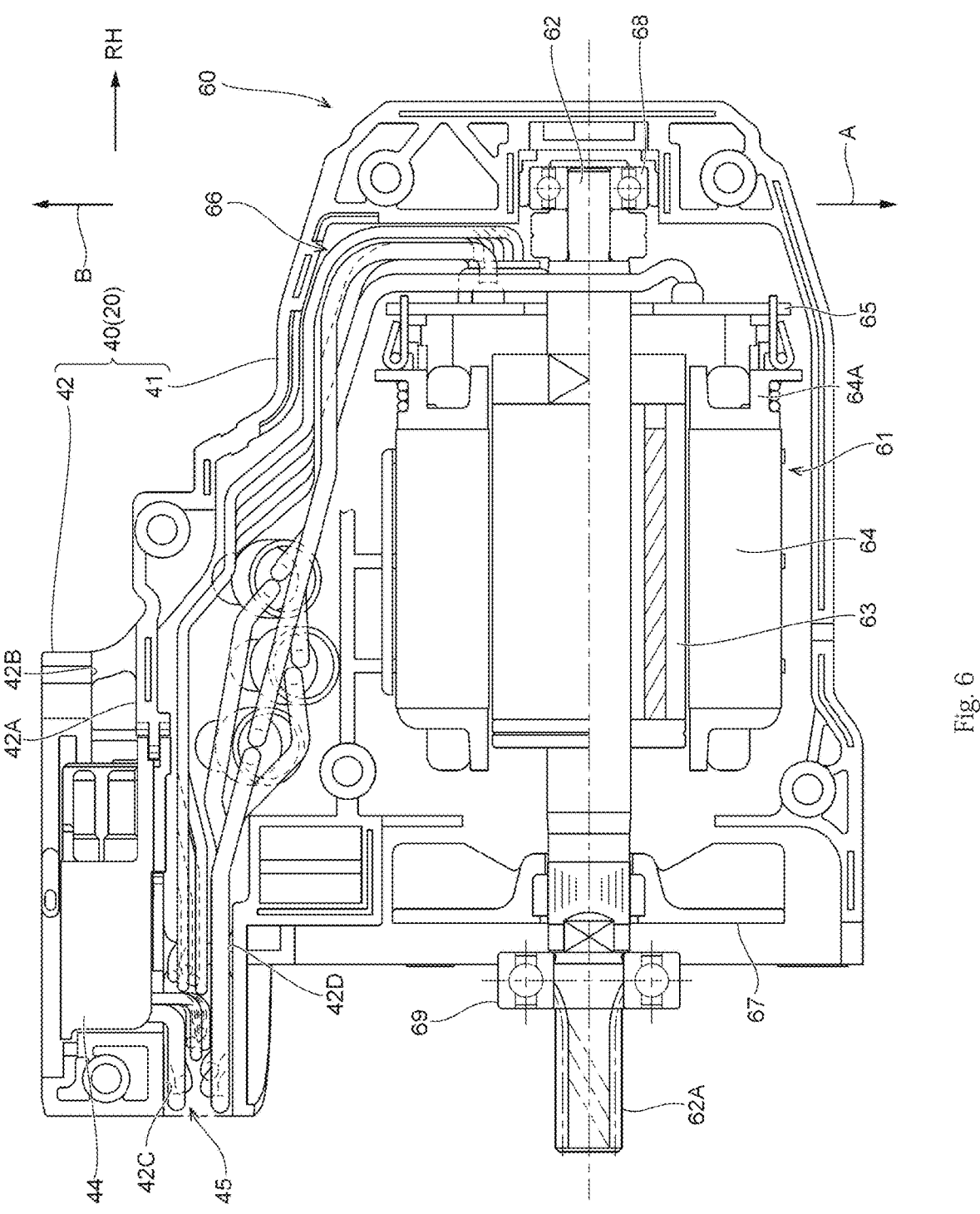
FIG. 6 is a cross-sectional view showing the inside of the motor housing shown in FIG. 6 viewed from other side in a second direction (cross-sectional view taken along a line 6-6 in FIG. 5)
Figure 7:
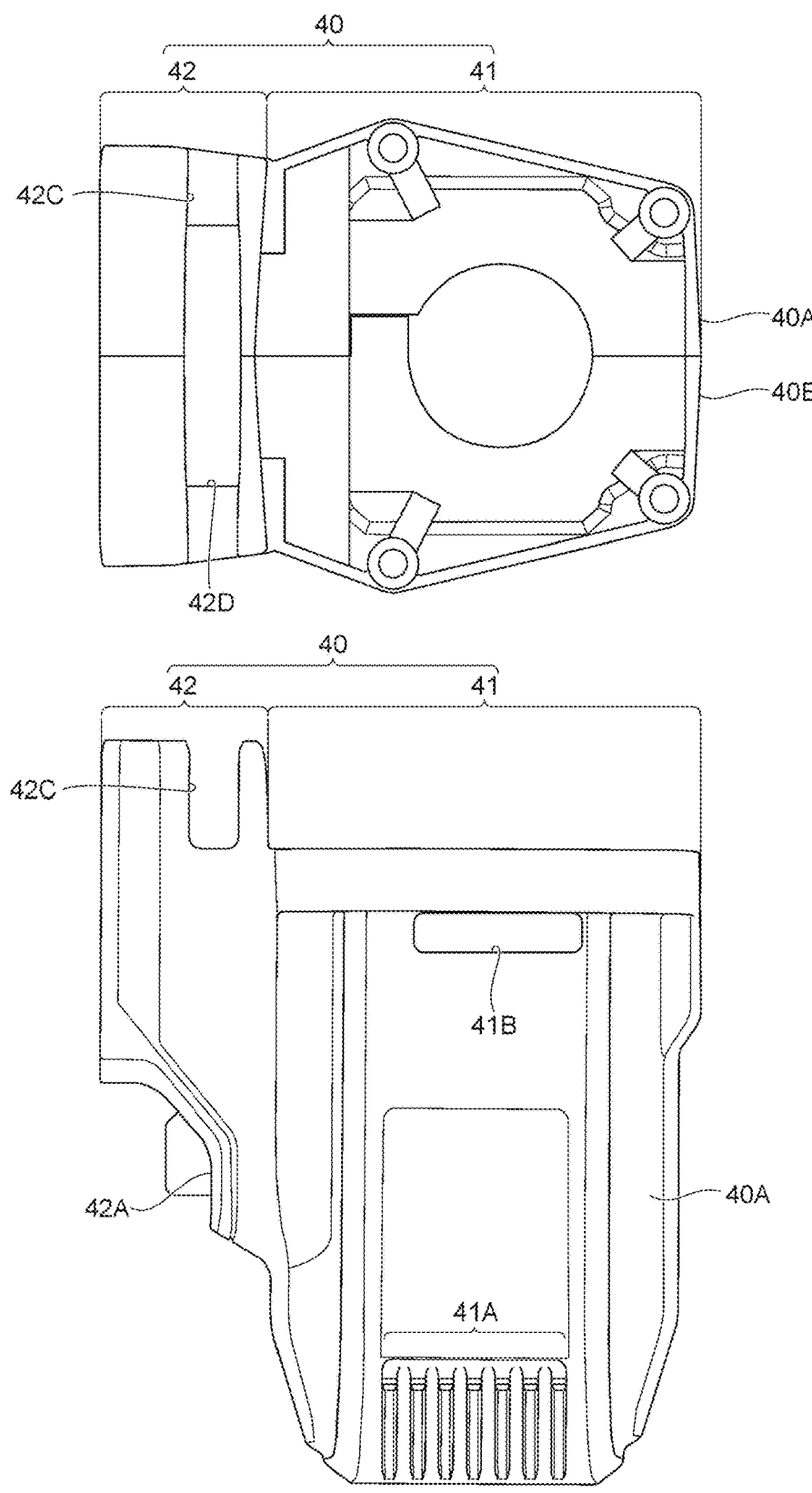
FIG. 7 is a two-sided view of the motor housing shown in FIG. 6 viewed from the left side and one side in the second direction.

The motor substrate 65 is electrically connected to the controller 70 described further below by means of wiring 66 (cf. FIG. 5 and FIG. 6). Specifically, the wiring 66 extended from the motor substrate 65 is disposed on the other side in the first direction of the brushless motor 61, is inserted through the wiring insertion hole 42D, and is arranged in the wiring hole 42C. The wiring 66 is bent to the one side in the first direction in the wiring hole 42C, inserted through the wiring insertion portion 35B, and arranged in the wiring housing 32B and connected to the controller 70 described further below.

The left portion of the drive shaft 62 is provided with the fan 67 integrally rotatable on the right side of the second motor bearing 69. The fan 67 is configured as a centrifugal fan, and the exhaust hole 41B of the motor housing 40 described above is disposed radially outside of the fan 67. As a result, when the fan 67 rotates, the cooling air AR flows into the motor housing 40 from the intake hole 41A of the motor housing 40 and is discharged from the exhaust hole 41B, cooling the brushless motor 61 by the cooling air AR. Furthermore, the cooling air AR discharged from the exhaust hole 41B is configured to flow into the airflow path 32C from the blowing hole 32D of the handle housing 30 and to flow in the airflow path 32C to the other side in the first direction (cf. FIG. 5 and FIG. 8).

Controller 70

As shown in FIG. 4 and FIG. 5, the controller 70 is formed in a substantially rectangular flat shape with the second direction as the thickness direction. The controller 70 is attached to a pair of controllers holding portions 32A of the handle housing 30 and is housed in the upper housing portion 32. In other words, the controller 70 is disposed on one side in the second direction of the wiring housing 32B of the upper housing portion 32. The controller 70 has a control substrate, not shown, and the wiring 45 and wiring 66 housed in the wiring housing 32B are connected to the control substrate. The control substrate has an inverter circuit that performs various controls such as drive control of the brushless motor 61, etc. The inverter circuit is configured as a circuit with bridge-connected multiple switching elements.

Transmission Mechanism 72

As shown in FIG. 8, the transmission mechanism 72 has the output shaft 73 as an output portion with the left-right direction as axial direction. The output shaft 73 is disposed in the transmission mechanism housing 22D of the saw cover 22 and below the drive shaft 62 of the brushless motor 61. The right end of the output shaft 73 is rotatably supported by a first bearing 74 fixed to the transmission mechanism housing 22D, and the left side portion of the output shaft 73 is rotatably supported by a second bearing 75 connected to the saw cover 22.

A transmission gear 76 is provided on the right-side portion of the output shaft 73 integrally rotatable, and the transmission gear 76 is meshed with the pinion gear 62A of the drive shaft 62. The left end of the output shaft 73 is configured as a tool attachment portion 73A. The tool attachment portion 73A is formed in a substantially cylindrical shape, and a female screw is formed on the inner circumference of the tool attachment portion 73A. The circular saw blade 14 is attached to the tool attachment portion 73A by externally fitting the center portion of the circular saw blade 14 into the tool attachment portion 73A and screwing a bolt BL into the tool attachment portion 73A. As a result, the output shaft 73 and the circular saw blade 14 are configured to rotate around the axis of the output shaft 73 when the brushless motor 61 is driven.

As also shown in FIG. 1 and FIG. 2, the lower part of the circular saw blade 14 is covered by a protective cover 78. The protective cover 78 is formed in a substantially semicircular shape that is formed convex toward the lower side when viewed from the right side and concave toward the upper side. The protective cover 78 is connected to the output shaft 73 in a revolvable manner around the axis of the output shaft 73. Furthermore, the protective cover 78 is held in the position shown in FIG. 1 and FIG. 2 by the force applied around the axis of the output shaft 73 by a force spring not shown. During the cutting process by the cutting work machine 10, the protective cover 78 is revolved by the material to be processed against the force of the force spring and is disposed inside the saw cover 22 to expose the blade of the circular saw blade 14. During said cutting process, cutting chips are rolled up at the front end of the circular saw blade 14 and flow to the rear side between the protective cover 78 and the outer circumferential wall 22A of the saw cover 22.

Discharge Channel 80

Next, the discharge channel 80 provided in the saw cover 22 will be described. As shown in FIG. 2, FIG. 8, and FIG. 10 to FIG. 13, the discharge channel 80 is provided in the outer circumferential portion of the rear end of the saw cover 22 and is disposed rearward with respect to the center of the circular saw blade 14 and radially outside of the circular saw blade 14. Specifically, the discharge channel 80 is disposed radially outside of the protective cover 78, which is disposed inside the saw cover 22. The cutting chips flowing rearwardly between the protective cover 78 and the outer circumferential wall 22A of the saw cover 22 are discharged to the left side of the saw cover 22 by the discharge channel 80.

The discharge channel 80 is formed in a concave shape open to the left side. In other words, a discharge opening 81 configuring the opening of the discharge channel 80 is formed on the left wall 22C of the saw cover 22, and the discharge opening 81 extends in the circumferential direction of the circular saw blade 14 when viewed from the left side (opening side of the discharge channel 80). In other words, the discharge opening 81 extends in a downward sloping direction toward the rear side, when viewed from the left side. A rear edge 81A of the discharge opening 81 extends along the up-down direction. A bottom edge 81B of the discharge opening 81 extends along the front-back direction. The lower end of the rear edge 81A and the rear end of the bottom edge 81B are connected to each other. The area enclosed by the rear edge 81A and the bottom edge 81B of the discharge opening 81 is configured as a discharge outlet portion 82 (cf. the area indicated by the two-dot chain lines in FIG. 10), so that cutting chips that flow into the discharge channel 80 are mainly discharged from the discharge outlet portion 82. An upper inclined edge 81C and a lower inclined edge 81D of the discharge opening 81 are arranged substantially parallel, with the rear end of the upper inclined edge 81C connected to the upper end of the rear edge 81A and the rear end of the lower inclined edge 81D connected to the front end of the bottom edge 81B.

Furthermore, the discharge channel 80 is open to the front side, and said opening is configured as a discharge inlet portion 83 as an inlet portion. In other words, the discharge channel 80 has the inlet portion (discharge inlet portion 83) that opens forward. As a result, the discharge inlet portion 83 communicates the inside of the discharge channel 80 with the inside of the saw cover 22, and cutting chips are allowed to flow into the discharge channel 80 from the discharge inlet portion 83.

Figure 11:
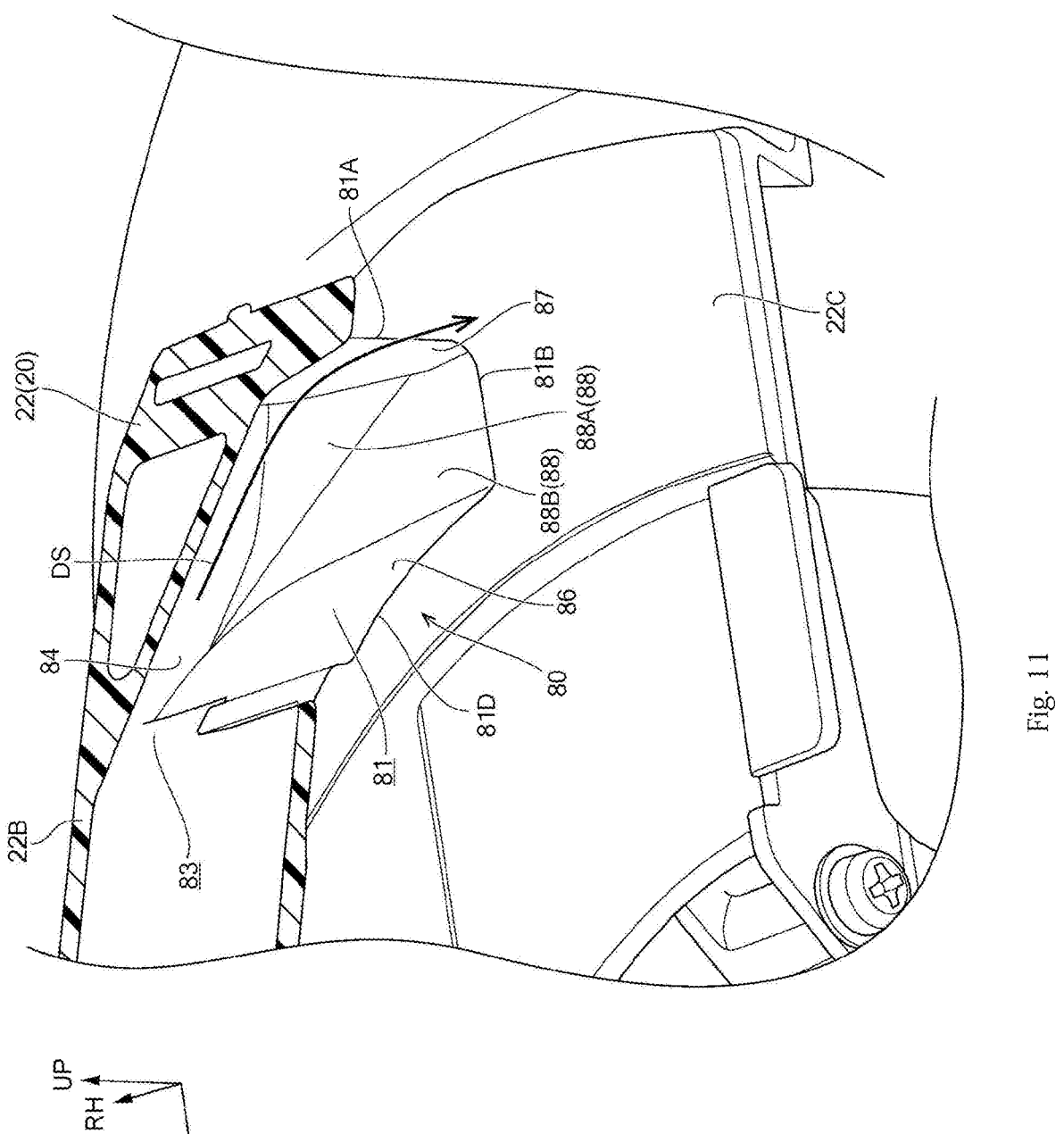
FIG. 11 is a cross-sectional view of the inside of the discharge channel shown in FIG. 10, viewed diagonally from the front left side, with the saw cover partially cut away.
Figures 12A, 12B:
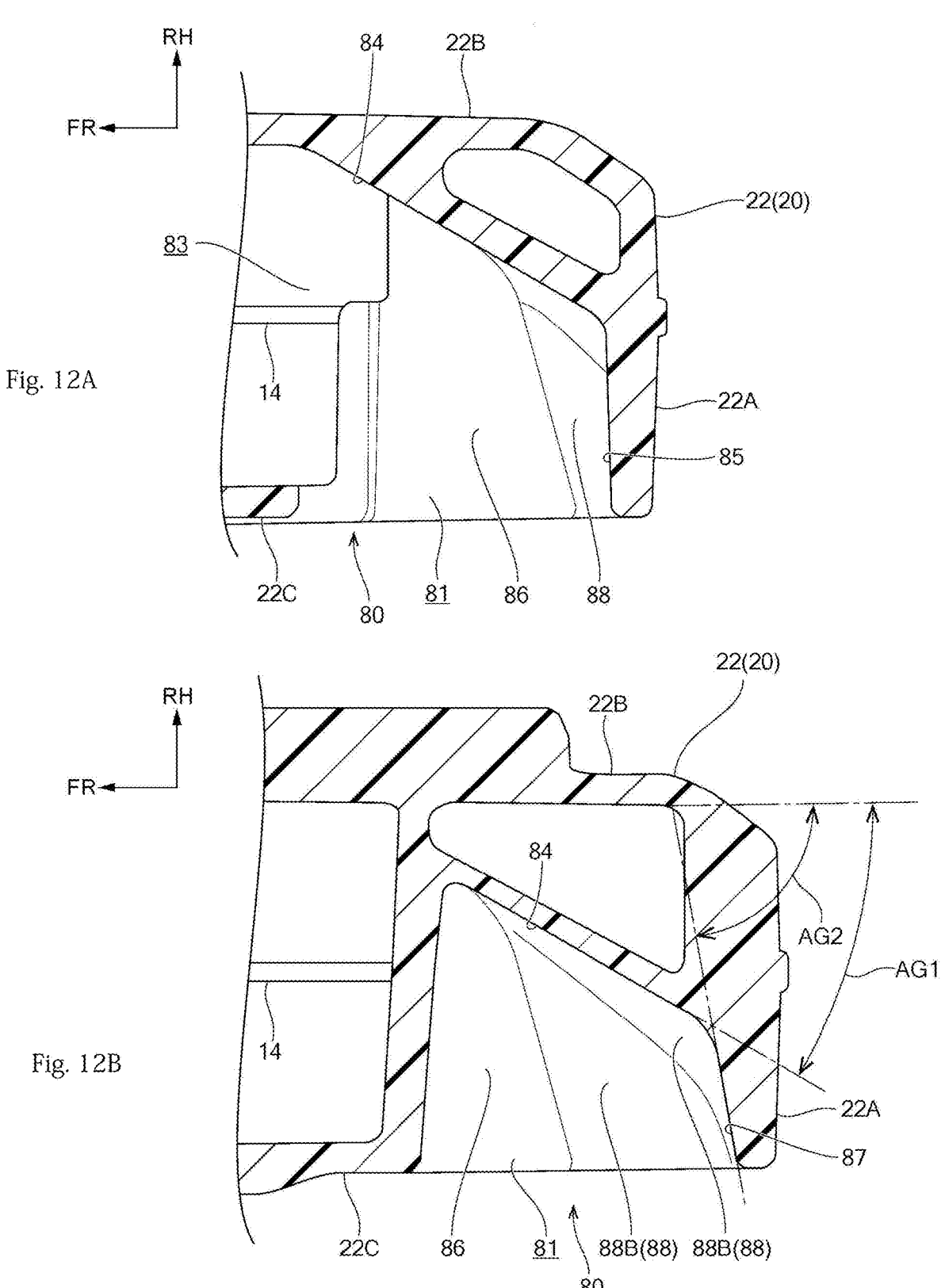
FIG. 12A is a cross-sectional view viewed from above showing the upper portion of the discharge channel shown in FIG. 10 (cross-sectional view taken along the line 12A-12A in FIG. 10), and 12B is a cross-sectional view viewed from above showing a connecting portion between a side guide surface and a rear guide surface of the discharge channel shown in FIG. 10 (cross-sectional view taken along the line 12B-12B in FIG. 10).
Figure 13:
FIG. 13 is a cross-sectional view viewed from the rear side showing a rear end portion of the discharge channel shown in FIG. 10 (cross-sectional view taken along the line 13-13 in FIG. 10).
Figure 13:
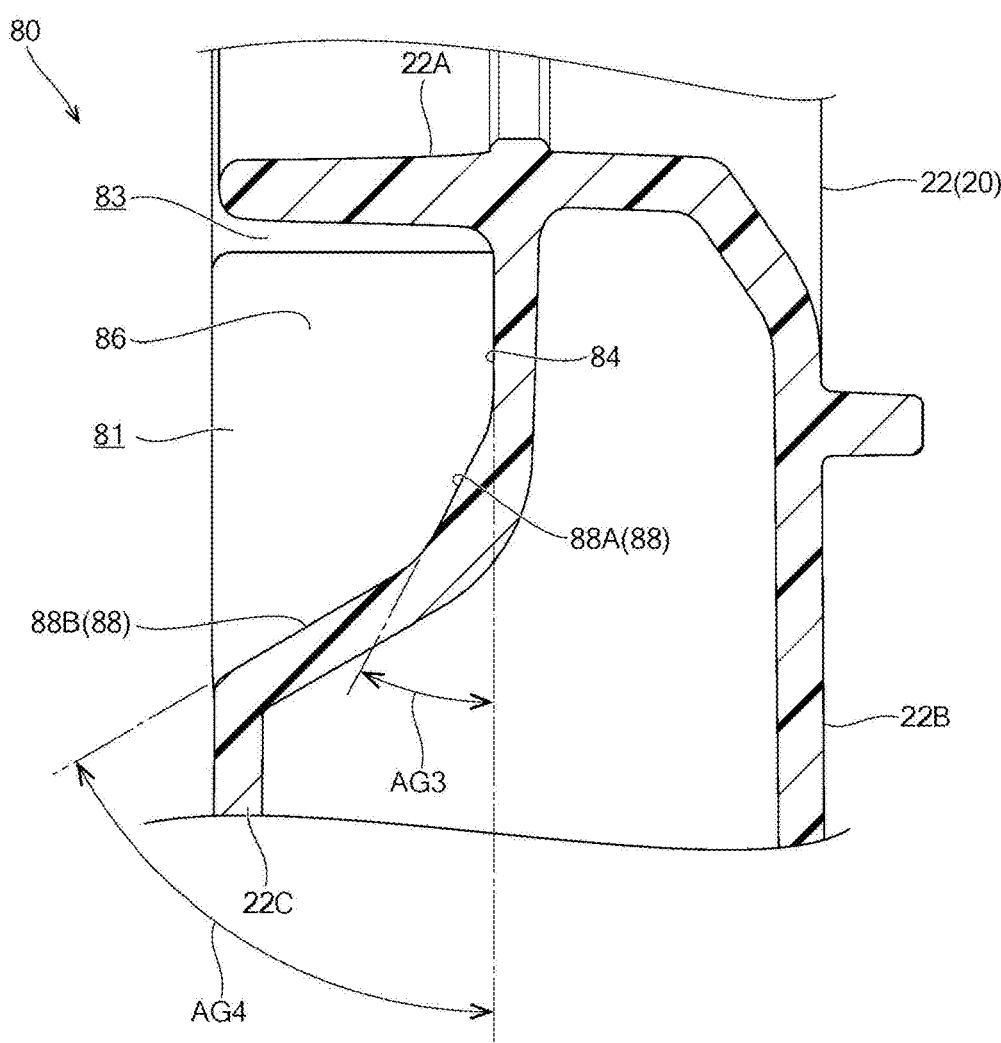

The discharge channel 80 has a side guide surface 84 that constitutes the left side surface of the discharge channel 80. The discharge channel 80 also has an upper surface 85 extending to the right from the upper inclined edge 81C of the discharge opening 81, a lower surface 86 extending to the right from the lower inclined edge 81D of the discharge opening 81, a rear guide surface 87 extending to the right from the rear edge 81A of the discharge opening 81, and a lower-guide surface 88 extending to the right from the bottom edge 81B of the discharge opening 81. The right ends of the upper surface 85, lower surface 86, rear guide surface 87, and lower-guide surface 88 are connected to the side guide surface 84, forming a concave shape with the discharge channel 80 open to the left side. The upper surface 85 of the discharge channel 80 is constituted by the inner circumference surface of the outer circumferential wall 22A of the saw cover 22. In FIG. 11, a flat surface area (side guide surface 84, rear guide surface 87, and lower-guide surface 88) are represented as continuously connected, but as shown in FIG. 12 and FIG. 13, the connected portions of the flat surface area form a gently curved surface.

The side guide surface 84 is inclined to the left side toward the rear side, when viewed from above. Specifically, an inclination angle AG1 of the side guide surface 84 with respect to the front-back direction (cf. FIG. 12B) is set to 10 degrees or more and 50 degrees or less (in this embodiment, 30 degrees). The front end of the side guide surface 84 is disposed to the right than the circular saw blade 14. As a result, the cutting chips that flow into the discharge channel 80 flow along the side guide surface 84 to the rear diagonal downward side and also flow toward the discharge opening 81 (cf. arrow DS shown in FIG. 10 and FIG. 11). In other words, the side guide surface 84 is configured as a surface that guides cutting chips that flow in from the discharge inlet portion 83 to the left side (discharge outlet portion 82 side). The side guide surface 84 is a part of the guide surface in the present invention. The side guide surface 84 is an example of a first guide surface in the present invention. A guide surface in the present invention is a wall portion that guides cutting chips that flow into the discharge channel 80 so that they flow toward the discharge opening 81 side. The side guide surface 84 functions as a guide surface for cutting chips moving backward.

The rear guide surface 87 inclines rearward toward the left side when viewed from above, and the right end of the upper portion of the rear guide surface 87 is connected to the rear end of the side guide surface 84. An inclination angle AG2 of the rear guide surface 87 with respect to the front-back direction (cf. FIG. 12B) is set greater than the inclination angle AG1 of the side guide surface 84. Specifically, the inclination angle AG2 of the rear guide surface 87 with respect to the front-back direction is set to 60 degrees or more and 90 degrees or less (in this embodiment, 80 degrees). The right end of the rear guide surface 87 is disposed to the left than the circular saw blade 14. As a result, cutting chips flowing into the rear end of the side guide surface 84 along the side guide surface 84 hit the rear guide surface 87 and flow along the rear guide surface 87 to the left side (toward the discharge opening 81) (cf. arrow DS shown in FIG. 10 and FIG. 11). In other words, the rear guide surface 87 is configured as a guide surface that changes the outflow direction of cutting chips flowing into the rear end of the discharge channel 80 to the left side (discharge opening 81 side). The rear guide surface 87 is part of the guide surface in the present invention. The rear guide surface 87 is an example of a second guide surface in the present invention. The rear guide surface 87 functions as a guide surface for cutting chips moving backward. Thus, the side guide surface 84 and the rear guide surface 87 set the inclination angle of the chip guide surface with respect to the left-right direction in two steps, angle increasing toward the left side. The inclination angles AG1 and AG2 should be set so that the difference between the inclination angle AG2 of the rear guide surface 87 and the inclination angle AG1 of the side guide surface 84 is less than 60 degrees.

The lower-guide surface 88 is disposed below the rear end of the side guide surface 84 and adjacent to the front side of the lower portion of the rear guide surface 87, and is connected to the side guide surface 84 and the rear guide surface 87. The lower-guide surface 88 is inclined downwardly toward the left side when viewed from the front-back direction.

The lower-guide surface 88 comprises an upper lower-guide surface 88A, which constitutes the upper portion of the lower-guide surface 88 and a lower lower-guide surface 88B comprising the lower portion of the lower-guide surface 88. The upper lower-guide surface 88A is formed in a substantially triangular shape when viewed from the left side, and the upper and lower widths of the upper lower-guide surface 88A viewed from the left side are set to become wider toward the rear side. An inclination angle AG3 of the upper lower-guide surface 88A with respect to the up-down direction (cf. FIG. 13) is set to be smaller than an inclination angle AG4 of the lower lower-guide surface 88B with respect to the up-down direction (cf. FIG. 13). As a result, the inclination angle of the lower-guide surface 88 with respect to the up-down direction is set in two steps, increasing toward the lower side. The inclination angle of the upper lower-guide surface 88A with respect to the front-back direction is slightly greater than the inclination angle AG1 of the side guide surface 84 (in this embodiment, 32 degrees). The lower-guide surface 88 is an example of the guide surface in the present invention. The upper lower-guide surface 88A is part of the guide surface in the present invention and is an example of the first guide surface. The lower lower-guide surface 88B is part of the guide surface in the present invention and is an example of the second guide surface. The upper lower-guide surface 88A functions as the guide surface for cutting chips moving backward. The upper lower-guide surface 88A also functions as a guide surface for cutting chips moving downward. The lower lower-guide surface 88B functions as a guide surface for cutting chips moving downward.

Suspension Mechanism 90

As shown in FIG. 1 through FIG. 4 and FIG. 14, the suspension mechanism 90 comprises a fixing member 91, a suspension arm 92, and a clutch 94. The fixing member 91 is fastened to the upper end of the handle housing 30 and is disposed behind the sub-handle 56. The fixing member 91 has a support cylinder 91A. The support cylinder 91A is formed in a substantially cylindrical shape with the first direction as an axial direction. A step 91B is formed in the inner circumference of the support cylinder 91A, and the inner diameter of one side in the first direction of the support cylinder 91A is set smaller than that of the other side in the first direction of the support cylinder 91A.

The suspension arm 92 is comprised by a rod-shaped member with a circular cross section and is bent into a predetermined shape. A base end (one end) of the suspension arm 92 is comprised as a supported portion 92A. The supported portion 92A of the suspension arm 92 is inserted into the support cylinder 91A and rotatably supported by the support cylinder 91A, and the suspension arm 92 is extended from the support cylinder 91A to the other side in the first direction. Specifically, the suspension arm 92 is configured to rotate between a retracted position (position indicated by the solid line in FIG. 1) and an expanded position, which is rotated substantially 90 degrees from the retracted position (position indicated by the two-dot chain line in FIG. 1).

An offset portion 92B is formed in the middle portion of the suspension arm 92, which is bent at a substantially right angle to the radially outside of the supported portion 92A. A hook 92C is formed at the tip of the suspension arm 92, and the hook 92C is formed in a substantially U-shape open to one side in the first direction. Specifically, the hook 92C comprises a first hook portion 92C1 extending from the tip of the offset portion 92B to the other side in the first direction, a second hook portion 92C2 extending from the tip of the first hook portion 92C1 to the radially outside of the supported portion 92A and arranged parallel to the offset portion 92B, and a third hook portion 92C3 extending from the tip of the second hook portion 92C2 to one side in the first direction. As a result, the hook 92C is disposed radially outside with respect to the supported portion 92A by the offset portion 92B and is disposed on the other side in the first direction than the supported portion 92A and the sub-handle 56.

In the retracted position of the suspension arm 92, the offset portion 92B is bent from the supported portion 92A to the left side, and the hook 92C is disposed on the left side than the supported portion 92A and does not project upward with respect to the supported portion 92A (one side in the second direction). In the expanded position of the suspension arm 92, the offset portion 92B is extended from the supported portion 92A to the upper side (one side in the second direction), and the hook 92C is disposed on the upper side with respect to the supported portion 92A (one side in the second direction). In the expanded position of the suspension arm 92, the entire suspension arm 92 is arranged to overlap the sub-handle 56 in the left-right direction.

A wedge portion 92D is formed on the second hook portion 92C2 and the third hook portion 92C3, and the wedge portion 92D protrudes from the second hook portion 92C2 and the third hook portion 92C3. When the hook 92C is hooked to the suspension support member 100 (cf. FIG. 15A and FIG. 15B), such as wood, and the cutting work machine 10 is suspended, the wedge portion 92D can bite into the suspension support member 100.

Figure 14:
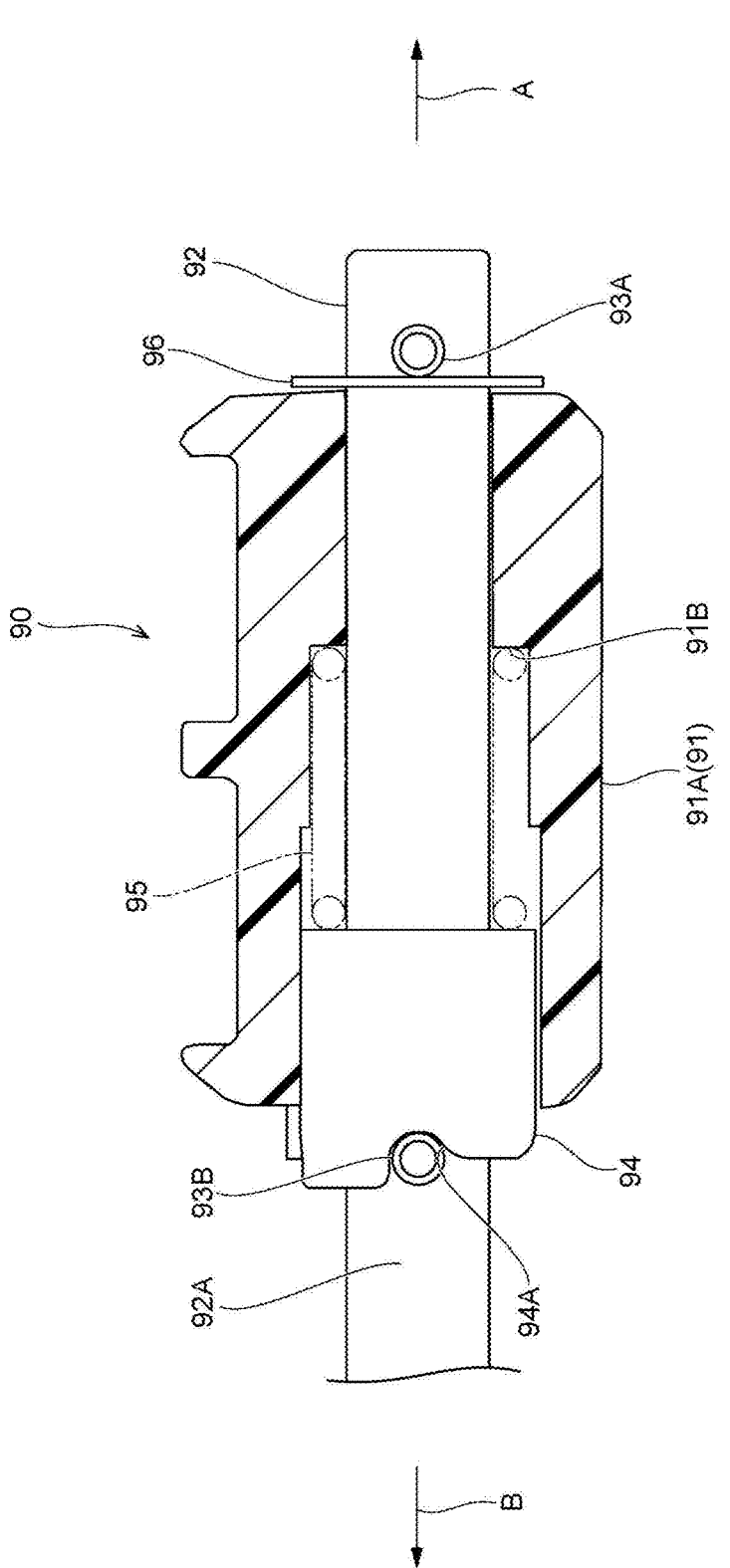
FIG. 14 is an explanatory diagram of a connection state between a suspension arm and a support cylinder of a fixed member in a suspension mechanism shown in FIG. 1, viewed from one side in the second direction, with the support cylinder broken.

As shown in FIG. 14, a pair of stoppers 93A and 93B are provided on the supported portion 92A of the suspension arm 92. The stoppers 93A and 93B are formed in a substantially cylindrical shape with the radial direction of the suspension arm 92 as the axial direction, are fixed to the suspension arm 92, and are spaced apart in the longitudinal direction of the suspension arm 92. One stopper 93A is disposed adjacent to one side in the first direction of the support cylinder 91A via a washer 96, and the movement of the suspension arm 92 to the other side in the first direction is restricted by the stopper 93A. The other stopper 93B is disposed on the other side in the first direction of the support cylinder 91A.

The clutch 94 is cylindrically formed and is externally fitted to the supported portion 92A of the support cylinder 91A. The clutch 94 is inserted into the support cylinder 91A in a manner that allows relative movement in the axial direction of the support cylinder 91A and does not allow relative rotation in the circumferential direction of the support cylinder 91A. The clutch 94 is urged toward the other side in the first direction by the force spring 95 disposed in the support cylinder 91A, and one end of the clutch 94 is in contact with the stopper 93B. Four engagement recesses 94A open to the other side in the first direction is formed on one end of the clutch 94. The four engagement recesses 94A are arranged every 90 degrees in the circumferential direction of the clutch 94. Both ends of the stopper 93B are engaged with the engagement recesses 94A to hold the suspension arm 92 in the retracted or expanded position. When the suspension arm 92 rotates, the clutch 94 is displaced in the support cylinder 91A to one side in the first direction against the force of the force spring 95, thereby allowing the suspension arm 92 to rotate.

As shown in FIG. 1, a center of gravity G of the cutting work machine 10 is located on one side in the first direction than the hook 92C in the expanded position and on the other side in the first direction than the sub-handle 56, when viewed from the left-right direction. More specifically, the center of gravity G of the cutting work machine 10 is located on one side in the first direction (front side) than the second hook portion 92C2, which mainly functions as the hooking portion in the hook 92C. A vertical distance L1 between the center of gravity G of the cutting work machine 10 and the hook 92C in the expanded position is set longer than a vertical distance L2 between the center of gravity G of the cutting work machine 10 and the lower surface of the base 12. Furthermore, the position of the sub-handle 56 is set so that the center of gravity G of the cutting work machine 10 and the sub-handle 56 overlap in the left-right direction (cf. FIG. 3). In other words, the sub-handle 56 is extended in the left-right direction so that the center of gravity G of the cutting work machine 10 and the sub-handle 56 overlap in the left-right direction. When viewed from the first direction, the base end of the hook 92C is disposed to overlap the upper end of the sub-handle 56. In other words, the length of the offset portion 92B is set so that a reference line CL extending in the first direction along the inner circumference surface of the first hook portion 92C1 touches the upper end of the sub-handle 56 when viewed from the left-right direction. When the cutting work machine 10 is not in use, the hook 92C is hooked from above to the upper end of the vertically extending suspension support member 100, so that the cutting work machine 10 is suspended from the suspension support member 100 (cf. FIG. 15A and FIG. 15B).

Effect

Next, the operation and effects of the cutting work machine 10 of this embodiment will be described.

During the cutting process with the cutting work machine 10 configured as described above, the base 12 is placed on the upper side of the material to be processed with the suspension arm 92 in the retracted position. By pulling the trigger 50, the brushless motor 61 is driven to rotate the circular saw blade 14 to one side in the direction of rotation. By moving the cutting work machine 10 toward the front side with respect to the material to be processed, the cutting process is performed on the material to be processed. At this time, the protective cover 78 is pressed and disposed inside the saw cover 22 by the material to be processed. The cutting chips generated during the cutting process are rolled up from the front end of the circular saw blade 14 inside the saw cover 22. The rolled-up cutting chips flow rearward between the outer circumferential wall 22A of the saw cover 22 and the protective cover 78.

The outer circumferential portion of the saw cover 22 is provided with a discharge channel 80, which is formed in a concave shape with the discharge opening 81 open to the left side. At the front end of the discharge channel 80, a discharge inlet portion 83 open to the front side is formed, and the discharge inlet portion 83 communicates the inside of the saw cover 22 with the inside of the discharge channel 80. Furthermore, the discharge channel 80 has the side guide surface 84 that constitutes the right-side surface of the discharge channel 80. The side guide surface 84 is inclined to the left toward the rear side, when viewed from above. As a result, cutting chips flowing to the rear side in the inside of the saw cover 22 flow into the discharge channel 80, and the cutting chips flowing into the discharge channel 80 are guided by the side guide surface 84 and flow to the rear end of the discharge channel 80.

The rear surface of the discharge channel 80 is configured by the rear guide surface 87, and the rear guide surface 87 is inclined toward the rear side toward the left side. Specifically, the inclination angle AG2 of the rear guide surface 87 with respect to the front-back direction is set at 80 degrees and is set greater than the inclination angle AG1 of 30 degrees of the side guide surface 84 with respect to the front-back direction. As a result, cutting chips that flowed along the side guide surface 84 to the rear end of the discharge channel 80 hit the rear guide surface 87, and the outflow direction of cutting chips is changed to the left side (toward the discharge opening 81). As a result, cutting chips are discharged from the discharge opening 81 to the substantially left side, thereby improving the workability of the cutting work machine 10.

That is, during the cutting process with the cutting work machine 10, the operator generally moves the cutting work machine 10 toward the front side toward the material to be processed, while being positioned behind the circular saw blade 14. More specifically, the operator, who is positioned further rearward than the cutting work machine 10, grips the handle 31 of the handle housing 30 and moves the cutting work machine 10 toward the front side. Therefore, if the rear guide surface 87 is omitted in the discharge channel 80 and the rear end of the side guide surface 84 is connected to the rear edge 81A of the discharge opening 81, cutting chips will be discharged from the discharge opening 81 to the rear diagonal left side when viewed from above. In other words, cutting chips discharged from the discharge opening 81 may be blown out to the operator's side. In this case, the workability may be reduced due to cutting chips blown to the operator's side.

In contrast, in the cutting work machine 10 of the present embodiment, as described above, the rear surface of the discharge channel 80 is configured with a rear guide surface 87, and cutting chips flowing along the side guide surface 84 to the rear end side of the discharge channel 80 hit the rear guide surface 87, changing the outflow direction of cutting chips to the left side (toward the discharge opening 81). More specifically, the cutting chips flowing into the discharge channel 80 are guided by the upper inclined edge 81C so that the direction of movement is backward and downward, while the side guide surface 84 guides the cutting chips to move in the left direction (toward the discharge opening 81). In this case, the cutting chips are guided by the side guide surface 84, which reduces the speed at which they move backward. In other words, the cutting chips are urged to move to the left by contact with the side guide surface 84, but are braked with respect to backward movement. After being guided by the side guide surface 84, the cutting chips come into contact with the rear guide surface 87 or the upper lower-guide surface 88A. The cutting chips that come into contact with the rear guide surface 87 are guided toward the left (discharge opening 81) side in the same manner as when they come into contact with the side guide surface 84, so they lose their backward traveling force and move in a more leftward direction. The cutting chips that come into contact with the upper lower-guide surface 88A after contact with the side guide surface 84 are guided to the left and discharged while the backward traveling force is slightly reduced since the difference in inclination angle between the side guide surface 84 and the upper lower-guide surface 88A is minute (2 degrees). If the backward traveling force is not sufficiently reduced by contact with the upper lower-guide surface 88A, the cutting chips contact the rear guide surface 87 after contact with the upper lower-guide surface 88A and are discharged after the backward traveling force is further reduced. As a result, the cutting chips are discharged from the discharge opening 81 to the substantially left side, which suppresses the said cutting chips from being blown to the operator's side. In other words, the cutting chips are discharged after the backward traveling force is sufficiently reduced by the structure of the discharge channel 80, so that cutting chips are suppressed from being discharged to the operator's side at the rear. Thus, the workability of the cutting work machine 10 can be improved. In addition, as described above, the cutting chips are reduced in backward traveling force and guided leftward (i.e., the direction of movement is adjusted) a plurality of times (in multiple steps) by a plurality of surfaces. For example, when trying to reduce the backward traveling force of cutting chips with one surface all at once, the braking force may be too strong and even the leftward traveling force may be lost, causing cutting chips to adhere to and accumulate inside the discharge channel 80. If all of the surfaces from the discharge inlet portion 83 to the discharge opening 81 are connected by curved surfaces instead of using flat surface area, the cutting chips will continuously contact the inside of the discharge channel 80 from the inlet to the outlet and be braked, which may cause the cutting chips to stop inside the discharge channel 80 due to excessive braking force. In contrast, in the present invention, by using a multi-step system with multiple surfaces to guide the cutting chips, backward discharge of the cutting chips can be suppressed without excessively losing momentum of cutting chips, thereby improving workability while suppressing chip accumulation and clogging.

The number of surfaces that guide cutting chips (to reduce backward traveling force) should be limited to about eight at most, since too many surfaces may cause the brake to work continuously and lose too much momentum of cutting chips as in the case of curved surfaces. In other words, there should be no less than two and no more than eight surfaces to guide cutting chips.

The discharge channel 80 has the lower-guide surface 88. The lower-guide surface 88 is disposed below the rear end of the side guide surface 84 and adjacent to the front side of the lower part of the rear guide surface 87, and is connected to the side guide surface 84 and the rear guide surface 87. The lower-guide surface 88 is inclined downward toward the left side when viewed from the front-back direction. As a result, the lower-guide surface 88 can suppress cutting chips flowing into the rear end of the discharge channel 80 from accumulating at the discharge outlet portion 82.

The lower-guide surface 88 comprises an upper lower-guide surface 88A, which constitutes the upper portion of the lower-guide surface 88, and a lower lower-guide surface 88B, which constitutes the lower portion of the lower-guide surface 88. Furthermore, the inclination angle AG3 of the upper lower-guide surface 88A with respect to the up-down direction is set smaller than the inclination angle AG4 of the lower lower-guide surface 88B with respect to the up-down direction. As a result, the inclination angle of the lower-guide surface 88 with respect to the up-down direction is set in two steps and increases toward the lower side. Therefore, cutting chips flowing from the rear end of the side guide surface 84 to the lower-guide surface 88 can be effectively suppressed from accumulating in the discharge outlet portion 82.

The upper lower-guide surface 88A is formed in a substantially triangular shape, when viewed from the left side, and the up-down widths of the upper lower-guide surface 88A viewed from the left side become wider toward the rear side. As a result, the proportion of the upper lower-guide surface 88A at the rear end of the lower-guide surface 88 (the portion connected to the rear guide surface 87) can be increased. Therefore, the rear guide surface 87 is smoothly connected to the lower-guide surface 88, and cutting chips that flow around the connection between the upper lower-guide surface 88A and the rear guide surface 87 can efficiently flow to the lower lower-guide surface 88B side and be discharged from the discharge opening 81. Therefore, it is possible to more effectively suppress cutting chips that flowed from the rear end of the side guide surface 84 to the lower-guide surface 88 side from accumulating in the discharge outlet portion 82.

The discharge opening 81 of the discharge channel 80 is formed on the outer circumference of the rear end of the saw cover 22 and extends in the circumferential direction of the circular saw blade 14, when viewed from the left side. Specifically, the discharge opening 81 is inclined downward toward the rear side, when viewed from the left side. As a result, cutting chips flowing rearwardly along the circumferential direction of the circular saw blade 14 can efficiently flow into the inside of the discharge channel 80 from the discharge inlet portion 83 of the discharge channel 80 and efficiently discharge cutting chips that have flowed into the discharge channel 80 from the discharge outlet portion 82.

The rear edge 81A of the discharge opening 81 is extended along the up-down direction, when viewed from the left side. The rear guide surface 87 is extended from the rear edge 81A to the right side and connected to the rear end of the side guide surface 84. As a result, cutting chips flowing along the rear guide surface 87 to the left side can be discharged well from the discharge outlet portion 82.

Figures 15A, 15B:
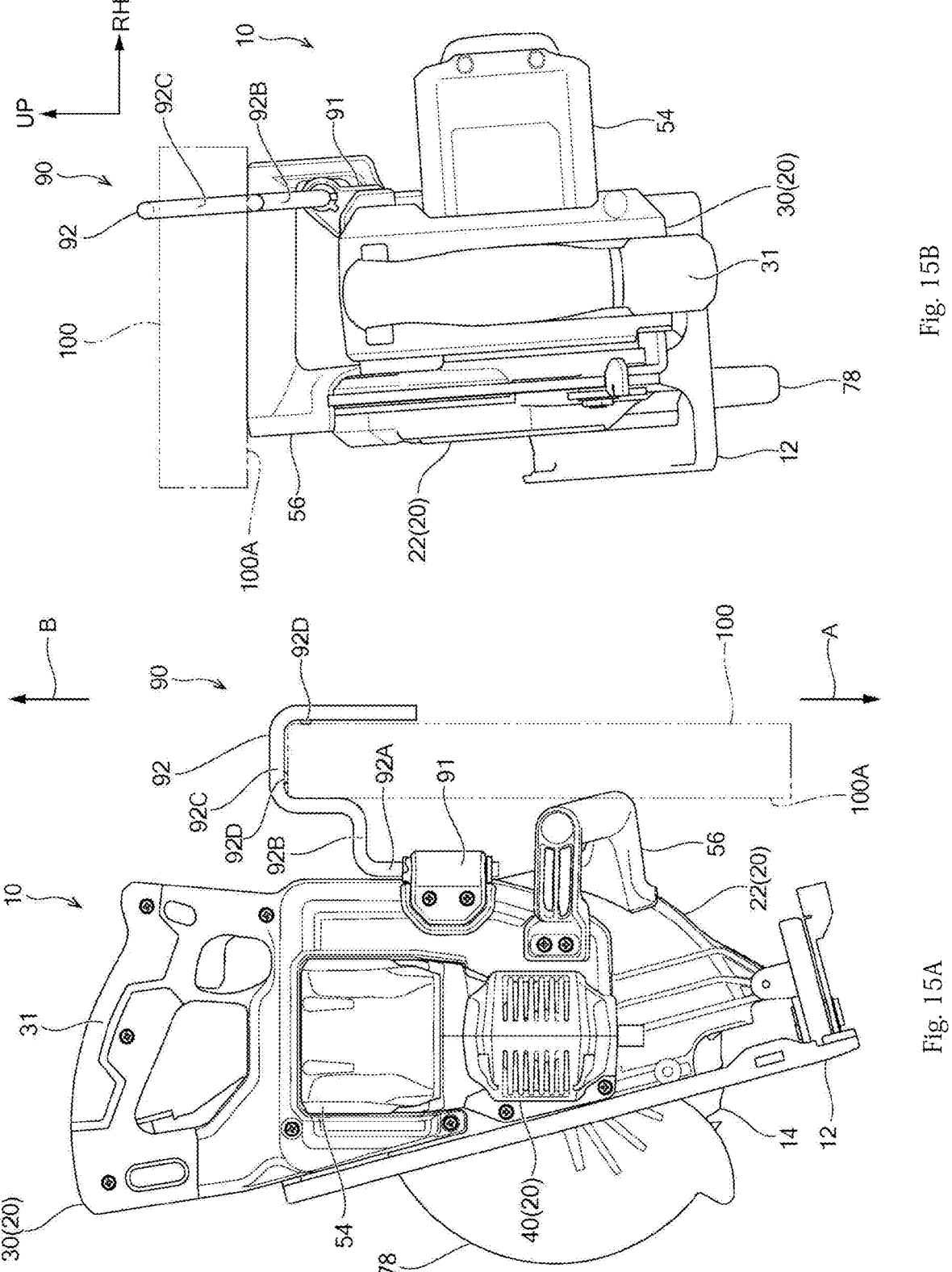
FIG. 15A is an explanatory diagram viewed from the right side for explaining a state in which the cutting work machine shown in FIG. 1 is suspended from a suspension support member, and 15B is an explanatory diagram of the cutting work machine of 15A viewed from above in a vertical direction.

When the cutting work machine 10 is not in use, the suspension arm 92 is used to suspend the cutting work machine 10 from the suspension support member 100. Specifically, as shown in FIG. 15A and FIG. 15B, the suspension arm 92 is rotated from the retracted position to the expanded position to dispose the hook 92C of the suspension arm 92 on the upper side of the housing 20. The hook 92C of the suspension arm 92 is then hooked from the upper side to the upper end of the vertically extended suspension support member 100. As a result, the cutting work machine 10 is suspended from the suspension support member 100.

The sub-handle 56 is provided at the upper end of the handle housing 30. The sub-handle 56 protrudes upward from the handle housing 30 and is disposed on one side in the first direction (opening side of the hook 92C) than the suspension arm 92. Therefore, in the suspension state of the cutting work machine 10 on the suspension support member 100, the sub-handle 56 is disposed vertical lower side with respect to the hook 92C and comes into contact with the suspension support member 100. As a result, the cutting work machine 10 in the suspension state can be supported by the sub-handle 56 in contact with the suspension support member 100 in the vertical lower side with respect to the hook 92C. Therefore, the cutting work machine 10 can be suspended from the suspension support member 100 in a stable state.

The center of gravity G of the cutting work machine 10 is located on one side in the first direction than from the hook 92C, in the side view, and the sub-handle 56 is disposed on one side in the first direction than from the center of gravity G of the cutting work machine 10. In other words, in the suspension state, the center of gravity G and the sub-handle 56 are disposed lower than the hook 92C. Therefore, in the suspension state of the cutting work machine 10, a counter-clockwise rotational moment around the contact portion between the hook 92C and the suspension support member 100 acts on the cutting work machine 10, when viewed from the right side. As a result, the sub-handle 56 can be brought into contact with the suspension support member 100 with a pushing force from the sub-handle 56 to substantially one side in the second direction acting on the suspension support member 100. Therefore, the suspension state of the cutting work machine 10 can be further stabilized.

The sub-handle 56 is extended in the left-right direction. Therefore, in the suspension state of the cutting work machine 10, the sub-handle 56 and one side 100A on the cutting work machine 10 side of the suspension support member 100 can be brought into contact with each other over the entire longitudinal direction of the sub-handle 56 (cf. FIG. 15B). In other words, the sub-handle 56 can be brought into contact with one side 100A of the suspension support member 100 by a line, a surface, or multiple points. Thus, the suspension state of the cutting work machine 10 can be further stabilized. In this embodiment, a stable suspension state is achieved by linear contact of the sub-handle 56, but the present invention is not limited to this. To achieve a stable suspension state, the sub-handle 56 need only be brought into contact with the suspension support member 100 at two or more points. This allows the cutting work machine 10 to be supported at three or more points together with the hook 92C, thus enabling a stable suspension state to be realized. In this embodiment, the sub-handle 56 is in linear contact with the suspension support member 100, and since linear contact is a collection of multiple point contacts, it is in contact at two or more points. In other words, contact at two or more points includes linear contact and surface contact.

In the left-right direction, the hook 92C in the expanded position is disposed overlapping the sub-handle 56, and the center of gravity G of the cutting work machine 10 is positioned overlapping the sub-handle 56. As a result, the cutting work machine 10 can be suspended from the suspension support member 100 with the pushing force acting from the sub-handle 56 to the suspension support member 100 acting substantially uniformly in the longitudinal direction of the sub-handle 56. Therefore, the suspension state of the cutting work machine 10 can be effectively stabilized.

The vertical distance L1 between the center of gravity G of the cutting work machine 10 and the hook 92C in the expanded position is set longer than the vertical distance L2 between the center of gravity G of the cutting work machine 10 and the lower surface of the base 12. As a result, the center of gravity G of the cutting work machine 10 can be positioned closer to the base 12, which is placed on the material to be processed, while increasing the rotational moment generated in the suspension state of the cutting work machine 10 during the cutting process of the material to be processed. As a result, the suspension state of the cutting work machine 10 can be stabilized while improving the workability of the cutting work machine 10.

The suspension arm 92 comprises a supported portion 92A comprising a base portion of the suspension arm 92, an offset portion 92B comprising a middle portion of the suspension arm 92, and a hook 92C comprising a tip portion of the suspension arm 92. The supported portion 92A is rotatably supported by the fixing member 91, and the offset portion 92B is bent at a substantially right angle radially outside from the supported portion 92A, so that the hook 92C in the expanded position is disposed above the supported portion 92A. As a result, for example, the vertical distance L1 between the center of gravity G of the cutting work machine 10 and the hook 92C can be easily set by the offset portion 92B.

The upper end of the sub-handle 56 (the end in the protruding direction) and the tip of the offset portion 92B overlap when viewed from the first direction. Therefore, the upper end of the sub-handle 56 and the first hook portion 92C1 of the hook 92C can be disposed to overlap in the first direction. As a result, the upper end of the sub-handle 56 can be disposed vertically below the first hook portion 92C1 when the cutting work machine 10 is suspended from the suspension support member 100.

The suspension arm 92 is rotatably supported by the fixing member 91 and rotates between the retracted position and the expanded position. In the expanded position of the suspension arm 92, the hook 92C protrudes to one side in the second direction than the sub-handle 56 to enable the hook 92C to be hooked onto the suspension support member 100. In the retracted position of the suspension arm 92, the hook 92C is disposed in a position where it does not protrude to one side in the second direction than the sub-handle 56, and the hook 92C cannot be hooked onto the suspension support member 100. As a result, by placing the suspension arm 92 in the retracted position, the cutting process can be performed with the suspension arm 92 retracted toward the handle housing 30.

The cutting work machine 10 has the controller 70 housed in the handle housing 30, and the controller 70 comprises an inverter circuit that controls the brushless motor 61. The brushless motor 61 is housed in the motor housing 40, and the motor housing 40 has the battery mounting portion 42 that supports the battery terminal 44. In other words, in the cutting work machine 10, the controller 70, including the inverter circuit that controls the brushless motor 61, is housed in the handle housing 30, which is separate from the motor housing 40 that houses the brushless motor 61. As a result, the motor housing 40 (i.e., motor unit 60) can be downsized and, in turn, the cutting work machine 10 to be downsized. In particular, in a cutting work machine 10 with the motor housing 40 protruding to the right with respect to the handle housing 30, the body size of the cutting work machine 10 can be reduced, especially with respect to the right direction.

The wiring hole 42C is formed on the motor housing 40. The wiring 45 extending from the battery terminal 44 and the wiring 66 extending from the brushless motor 61 are arranged in the wiring hole 42C and extended from the wiring hole 42C to connect to the controller 70. As a result, the assembly performance of the cutting work machine 10 can be improved. In other words, with the controller 70 attached to the handle housing 30 in a state where the motor unit 60 is connected to and unitized with the controller 70, the motor housing 40 can be attached to the saw cover 22. In this case, the wiring 45 and wiring 66 extending from the motor unit 60 can be housed in the wiring housing 32B of the handle housing 30 while wire processing them together. As a result, the assembly performance of the cutting work machine 10 can be improved compared to, for example, a configuration in which the wiring 45 and wiring 66 are wire processed separately.

In the motor unit 60, the brushless motor 61 is disposed on one side in the first direction of the battery terminal 44, and the wiring hole 42C in the motor housing 40 is disposed between the battery terminal 44 and the brushless motor 61. The controller 70 is disposed on one side in the second direction of the battery terminal 44. The wiring 45 and wiring 66 extending from the wiring hole 42C are housed in the wiring housing 32B and are disposed on the other side in the second direction with respect to the controller 70. In other words, the battery pack 54, wiring 45, wiring 66, and controller 70 can be gathered and disposed on the other side in the first direction with respect to the brushless motor 61, as well as arranged side by side in the second direction. Therefore, this can contribute to downsizing of the cutting work machine 10.

The wiring hole 42C is formed in a groove shape penetrating in the second direction. The wiring 45 and wiring 66 are extended from the wiring hole 42C to one side in the second direction and bent to the other side in the first direction, and are disposed on the other side in the second direction with respect to the controller 70. As a result, the wiring 45 and wiring 66 extended from the motor housing 40 can be disposed on the other side in the second direction of the controller 70 while forming the wiring 45 and wiring 66 to be extended to the controller 70 side by the wiring hole 42C.

The fan 67 is set integrally rotatable on the drive shaft 62 of the brushless motor 61. Furthermore, the blowing hole 32D is formed at the upper housing portion 32, and the exhaust hole 41B is formed at the motor housing 40. The cooling air AR generated by the fan 67 flows into airflow path 32C at the front end of the handle housing 30 through the exhaust hole 41B and the blowing hole 32D. As a result, the cooling air AR can pass through the airflow path 32C and be guided to the controller 70. As described above, the wiring 45 and wiring 66 are housed on the other side in the second direction of the controller 70. As a result, the cooling air AR can be guided to the controller 70 side while suppressing the wiring 45 and wiring 66 from obstructing the flow of the cooling air AR to the controller 70 side. Therefore, the controller 70 can be cooled well.

The battery pack 54 is disposed on the other side in the second direction with respect to the wiring housing 32B of the handle housing 30. The compartment wall 35A that divides the battery housing 35 (battery pack 54) and the wiring housing 32B is formed in the handle housing 30. As a result, the wiring 45 and wiring 66 connected to the controller 70 can be arranged in the wiring housing 32B along the compartment wall 35A while the battery pack 54 is disposed on the other side in the second direction of the controller 70.

The wiring insertion portion 35B is formed at the compartment wall 35A, and the wiring insertion portion 35B is disposed on one side in the second direction of the wiring hole 42C of the motor housing 40. As a result, wiring 45 and wiring 66, which are extended from the wiring hole 42C to one side in the second direction, can be housed in the handle housing 30 by inserting through the wiring insertion portion 35B, and also allows the wiring 45 and wiring 66 to be bent to the other side in the first direction by using the wiring insertion portion 35B.

In the mounting state of the battery pack 54, the left end of the battery pack 54 is disposed to the left side than the fan 67, where the battery pack 54 does not protrude to the right than the motor housing 40. As a result, protection performance for the battery pack 54 can be improved.

The motor housing 40 is configured by the motor housing members 40A and 40B, which are divided into two parts in the second direction, and the battery terminal 44 is held in the battery mounting portion 42 by being sandwiched between motor housing members 40A and 40B. This allows the battery terminal 44 to be provided in the battery mounting portion 42 with a simple configuration.

DESCRIPTION OF THE REFERENCE NUMERALS

10: Cutting work machine (work machine)
14: Circular saw blade
22: Saw cover
61: Brushless motor (prime mover)
73: Output shaft
80: Discharge channel
81: Discharge opening
81A: Rear edge
83: Discharge inlet portion (entrance portion)
84: Side guide surface
87: Rear guide surface
88: Lower-guide surface
88A: Upper lower-guide surface
88B: Lower lower-guide surface

What is claimed is:
1. A work machine comprising:
an output shaft driven by a power of a prime mover;
a disk-shaped circular saw blade held at an end portion of the output shaft in one side in an axial direction of the output shaft;
a saw cover that covers the circular saw blade; and
a discharge channel provided at the saw cover, disposed radially outside of the circular saw blade, with a discharge opening opened to one side in the axial direction, and discharges chips that flow backward inside the saw cover during processing through the discharge opening, wherein the discharge channel has a first guide surface that extends in a direction that intersects a direction of movement of the chips that flows into the discharge channel and guides the chips to the discharge opening, and a second guide surface that is connected between the first guide surface and the discharge opening, wherein at least one of the first guide surface and the second guide surface is configured as a plane surface, and the second guide surface has a greater inclination angle with respect to the direction of movement than the first guide surface.

2. The work machine according to claim 1, wherein the direction of movement is backward or downward.

3. The work machine according to claim 1, wherein the discharge channel includes:

a side guide surface that constitutes a side surface on other side in the axial direction in the discharge channel and inclines toward one side in the axial direction toward a rear side when viewed from above; and a rear guide surface that constitutes a rear surface of the discharge channel, is connected to a rear end of the side guide surface, and changes the direction of the chips flowing backward along the side guide surface to one side in the axial direction, wherein the first guide surface is the side guide surface and the second guide surface is the rear guide surface, wherein the direction of movement is backward.

4. The work machine according to claim 1, wherein the discharge channel includes:

a side guide surface that constitutes a side surface on other side in the axial direction in the discharge channel and inclines toward one side in the axial direction toward a rear side when viewed from above;

a rear guide surface that constitutes a rear surface of the discharge channel, is connected to a rear end of the side guide surface, and changes the direction of the chips flowing backward along the side guide surface to one side in the axial direction; and a lower-guide surface that constitutes a lower surface of the discharge channel, is disposed adjacent to the side guide surface and the rear guide surface, and is inclined downward toward one side in the axial direction when viewed from front-back direction, wherein the lower-guide surface has an upper lower-guide surface that constitutes an upper portion of the lower-guide surface, and a lower lower-guide surface that constitutes a lower portion of the lower-guide surface, wherein the first guide surface is the upper lower-guide surface and the second guide surface is the lower lower-guide surface, wherein the direction of movement is downward.

5. The work machine according to claim 1, wherein the first guide surface is plane.

6. The work machine according to claim 1, wherein the second guide surface is plane.

7. The work machine according to claim 1, wherein both the first and second guide surfaces are plane.

8. A work machine comprising:

an output shaft driven by a power of a prime mover;

a disk-shaped circular saw blade held at an end portion of the output shaft in one side in an axial direction of the output shaft;

a saw cover that covers the circular saw blade; and a discharge channel provided at the saw cover, disposed radially outside of the circular saw blade, with a discharge opening opened to one side in the axial direction, and discharges chips that flow backward inside the saw cover during processing through the discharge opening, wherein the discharge channel includes:

an inlet portion formed at a front end of the discharge channel and communicate an inside of the saw cover with an inside of the discharge channel;

a side guide surface that constitutes a side surface on other side in the axial direction in the discharge channel and inclines toward one side in the axial direction toward a rear side when viewed from above; and a rear guide surface that constitutes a rear surface of the discharge channel, is connected to a rear end of the side guide surface, and changes the direction of the chips flowing backward along the side guide surface to one side in the axial direction; and a lower-guide surface that constitutes a lower surface of the discharge channel, is disposed adjacent to the side guide surface and the rear guide surface, and is inclined downward toward one side in the axial direction when viewed from front-back direction, wherein the lower-guide surface includes:

an upper lower-guide surface that constitutes an upper portion of the lower-guide surface; and a lower lower-guide surface that constitutes a lower portion of the lower-guide surface, wherein an inclination angle of the upper lower-guide surface with respect to up-down direction is set smaller than the inclination angle of the lower lower-guide surface with respect to the up-down direction.

9. The work machine according to claim 8, wherein the rear guide surface is inclined rearwardly toward one side in the axial direction, when viewed from above.

10. The work machine according to claim 8, wherein an inclination angle of the rear guide surface with respect to the front-back direction is set greater than the inclination angle of the side guide surface with respect to the front-back direction when viewed from above.

11. The work machine according to claim 8, wherein a width of the upper lower-guide surface in the up-down direction is set to increase toward the rear side when viewed from one side in the axial direction.

12. The work machine according to claim 1, wherein the discharge opening is inclined downward toward a rear side, when viewed from the axial direction.

13. A work machine comprising:

an output shaft driven by a power of a prime mover;

a disk-shaped circular saw blade held at an end portion of the output shaft in one side in an axial direction of the output shaft;

a saw cover that covers the circular saw blade from at least one side in the axial direction and from radially outside of the circular saw blade; and a discharge channel provided at the saw cover, disposed radially outside of the circular saw blade, formed in a concave shape with a discharge opening opened to one side in the axial direction, and discharges chips that flow backward inside the saw cover during processing through the discharge opening, wherein the discharge channel includes:

an inlet portion formed at a front end of the discharge channel and opened to a front side to communicate an inside of the saw cover with an inside of the discharge channel;

a side guide surface that constitutes a side surface on the other side in the axial direction in the discharge channel and inclines toward one side in the axial direction toward a rear side when viewed from above; and a rear guide surface that constitutes a rear surface of the discharge channel, is connected to a rear end of the side guide surface, and inclines rearward toward one side in the axial direction when viewed from above, wherein, at least one of the side guide surface and the rear guide surface is configured as a plane surface, and an inclination angle of the rear guide surface with respect to front-back direction when viewed from above is set to be 60 degrees or more and greater than the inclination angle of the side guide surface with respect to the front-back direction.

14. The work machine according to claim 13, wherein the inclination angle of the side guide surface with respect to the front-back direction is 10 degrees or more and 50 degrees or less.

15. The work machine according to claim 13, wherein a difference in inclination angle between the side guide surface and the rear guide surface is less than 60 degrees.

\* \* \* \* \*